(12) United States Patent
Juarez

(10) Patent No.: US 11,664,663 B2
(45) Date of Patent: May 30, 2023

(54) MICRO INVERTER AND CONTROLLER

(71) Applicant: Semtive Inc, Austin, TX (US)

(72) Inventor: Ignacio Juarez, Round Rock, TX (US)

(73) Assignee: Semtive Inc., Austin, TX (US)

( * ) Notice: Subject to any disclaimer, the term of this patent is extended or adjusted under 35 U.S.C. 154(b) by 34 days.

(21) Appl. No.: 17/275,332

(22) PCT Filed: Sep. 12, 2019

(86) PCT No.: PCT/US2019/050807
§ 371 (c)(1),
(2) Date: Mar. 11, 2021

(87) PCT Pub. No.: WO2020/056133
PCT Pub. Date: Mar. 19, 2020

(65) Prior Publication Data
US 2022/0052528 A1 Feb. 17, 2022

Related U.S. Application Data

(60) Provisional application No. 62/730,463, filed on Sep. 12, 2018.

(51) Int. Cl.
*H02J 3/38* (2006.01)
*H02J 13/00* (2006.01)
*H02J 7/35* (2006.01)
*H02J 3/32* (2006.01)

(52) U.S. Cl.
CPC ............... *H02J 3/381* (2013.01); *H02J 7/35* (2013.01); *H02J 13/00001* (2020.01); *H02J 13/00022* (2020.01); *H02J 3/32* (2013.01); *H02J 2300/26* (2020.01); *H02J 2300/28* (2020.01)

(58) Field of Classification Search
CPC ........ H02J 3/381; H02J 3/38; H02J 13/00001; H02J 13/00022; H02J 7/35; H02J 2300/28; H02J 2300/26; H02J 3/32; H02J 13/00
See application file for complete search history.

(56) References Cited

U.S. PATENT DOCUMENTS

| | | |
|---|---|---|
| 1,766,765 A | 6/1930 | Savonius |
| 3,944,782 A | 3/1976 | Metcalfe et al. |
| 4,291,235 A | 9/1981 | Bergey et al. |
| 4,318,019 A | 3/1982 | Teasley et al. |

(Continued)

FOREIGN PATENT DOCUMENTS

| | | |
|---|---|---|
| CN | 102801179 A | 11/2012 |
| DE | 202008006801 U1 | 3/2009 |

(Continued)

OTHER PUBLICATIONS

Ragheb, M.; Vertical axis wind turbines; University of Illinois at Urbana-Champaign; 1; 40 pages; Aug. 1, 2011.

(Continued)

*Primary Examiner* — Robert L Deberadinis
(74) *Attorney, Agent, or Firm* — Shay Glenn LLP

(57) ABSTRACT

A self-contained, all-in-one MPPT controller and micro-inverter that can be connected directly to the load (that can be on or off grid) using a standard power socket or to the load center, feeding energy to the grid generated by different kind of sources, including wind turbines, solar panels, hydro generators or gas generators, and that also controls a storage device to be used to reduce peak consumptions or as a back up solution.

46 Claims, 19 Drawing Sheets

(56) References Cited

U.S. PATENT DOCUMENTS

| | | | |
|---|---|---|---|
| 4,417,853 | A | 11/1983 | Cook |
| 4,449,053 | A | 5/1984 | Kutcher |
| 4,866,321 | A | 9/1989 | Blanchard et al. |
| 4,915,580 | A | 4/1990 | Obidniak |
| 4,976,587 | A | 12/1990 | Johnson et al. |
| 5,021,698 | A | 6/1991 | Pullen et al. |
| 5,601,951 | A | 2/1997 | Johnson et al. |
| 6,242,818 | B1 | 6/2001 | Smedley |
| 6,448,669 | B1 | 9/2002 | Elder |
| 6,533,986 | B1 | 3/2003 | Fosaaen et al. |
| 7,084,523 | B2 | 8/2006 | Noguchi |
| 7,218,974 | B2 | 5/2007 | Rumi et al. |
| 7,274,975 | B2 | 9/2007 | Miller |
| 7,404,700 | B1 | 7/2008 | Spanks, Jr. |
| 7,561,977 | B2 | 7/2009 | Horst et al. |
| 7,744,338 | B2 | 6/2010 | DeRuyter et al. |
| 8,272,843 | B1 | 9/2012 | Ryznic et al. |
| 8,487,470 | B2 | 7/2013 | Grassman |
| 8,550,786 | B2 | 10/2013 | Janiuk |
| 8,612,058 | B2 | 12/2013 | Khajehoddin et al. |
| 8,678,324 | B2 | 3/2014 | Hemmelgarn et al. |
| 8,680,705 | B2 | 3/2014 | Pujol Artigas |
| 8,894,373 | B2 | 11/2014 | Firic |
| 8,994,201 | B2 | 3/2015 | Farley |
| D738,305 | S | 9/2015 | Gochev |
| 9,404,474 | B2 | 8/2016 | Watanabe |
| 9,770,791 | B2 | 9/2017 | Hong |
| 2008/0283118 | A1 | 11/2008 | Rotzoll et al. |
| 2009/0068018 | A1 | 3/2009 | Corten |
| 2009/0074574 | A1 | 3/2009 | Godsk et al. |
| 2009/0206666 | A1 | 8/2009 | Sella et al. |
| 2009/0251002 | A1 | 10/2009 | Cohen et al. |
| 2009/0257884 | A1 | 10/2009 | Clark |
| 2011/0057452 | A1 | 3/2011 | Interlandi et al. |
| 2011/0089698 | A1 | 4/2011 | Ahmadi |
| 2011/0194938 | A1 | 8/2011 | Livingston |
| 2012/0170325 | A1 | 7/2012 | Jin et al. |
| 2012/0280510 | A1 | 11/2012 | Hwang |
| 2013/0049512 | A1 | 2/2013 | Jung |
| 2013/0068888 | A1 | 3/2013 | Smith |
| 2013/0287591 | A1 | 10/2013 | Plourde et al. |
| 2014/0030094 | A1 | 1/2014 | Dahl et al. |
| 2014/0205462 | A1 | 7/2014 | Gochev |
| 2014/0265579 | A1 | 9/2014 | Mumtaz |
| 2014/0361545 | A1 | 12/2014 | Ghosh |
| 2015/0155825 | A1 | 6/2015 | Sella et al. |
| 2015/0211483 | A1 | 7/2015 | Brendle et al. |
| 2015/0233353 | A1 | 8/2015 | Bertony |
| 2015/0345473 | A1 | 12/2015 | Bardia |
| 2016/0009034 | A1 | 1/2016 | Moors |
| 2016/0087444 | A1 | 3/2016 | Ottolini |
| 2016/0115939 | A1 | 4/2016 | Shair et al. |
| 2016/0164295 | A1 | 6/2016 | Cheng et al. |
| 2016/0176305 | A1 | 6/2016 | James et al. |
| 2016/0241039 | A1 | 8/2016 | Cheng et al. |
| 2016/0279867 | A1 | 9/2016 | Garm |
| 2016/0279899 | A1 | 9/2016 | Cantwell et al. |
| 2016/0312763 | A1 | 10/2016 | Arce et al. |
| 2017/0005564 | A1 | 1/2017 | Somani et al. |
| 2017/0015407 | A1 | 1/2017 | Garver |
| 2017/0074241 | A1 | 3/2017 | Koike |
| 2017/0096985 | A1 | 4/2017 | Bardia |
| 2017/0180134 | A1 | 6/2017 | King |
| 2017/0284363 | A1 | 10/2017 | Harrison |
| 2017/0331325 | A1 | 11/2017 | Ristau |
| 2018/0076624 | A1 | 3/2018 | Gudgel et al. |
| 2018/0100484 | A1 | 4/2018 | Deioma |
| 2018/0292090 | A1 | 10/2018 | Dyer et al. |
| 2018/0347541 | A1 | 12/2018 | Kudsk |
| 2019/0078553 | A1 | 3/2019 | Chen et al. |
| 2019/0093629 | A1 | 3/2019 | Juarez |
| 2019/0195191 | A1 | 6/2019 | Girolamo et al. |
| 2019/0242399 | A1 | 8/2019 | Kray et al. |
| 2019/0277247 | A1 | 9/2019 | Kratmann et al. |
| 2019/0309733 | A1 | 10/2019 | Grishauge et al. |
| 2020/0091725 | A1 | 3/2020 | Juarez |
| 2021/0381486 | A1 | 12/2021 | Juarez |
| 2022/0170441 | A1 | 6/2022 | Juarez |

FOREIGN PATENT DOCUMENTS

| | | |
|---|---|---|
| EP | 2039929 A1 | 3/2009 |
| EP | 2541048 A2 | 1/2013 |
| EP | 2594784 A2 | 5/2013 |
| JP | 2000284006 A | 10/2000 |
| JP | 2006073827 A | 3/2006 |
| JP | 2013110944 A | 6/2013 |
| JP | 5731048 B1 | 6/2015 |
| WO | WO2009/111355 A2 | 9/2009 |
| WO | WO2014/090219 A2 | 6/2014 |
| WO | WO2014/152073 A2 | 9/2014 |
| WO | WO2014/175755 A1 | 10/2014 |
| WO | WO2014/187912 A2 | 11/2014 |
| WO | WO2014/192015 A2 | 12/2014 |
| WO | WO2015/065291 A1 | 5/2015 |
| WO | WO2015/086872 A1 | 6/2015 |
| WO | WO2015/155782 A1 | 10/2015 |
| WO | WO2015/166477 A1 | 11/2015 |
| WO | WO2016/121389 A1 | 8/2016 |
| WO | WO2017/032541 A1 | 3/2017 |
| WO | WO2020/076824 A1 | 4/2020 |

OTHER PUBLICATIONS

Bibave et al.; A Novel Maximum Power Point Tracking Method for Wind Energy Conversion System . A Review; In2018 International Conference on Computation of Power, Energy, Information and Communication (ICCPEIC); pp. 430-433; IEEE; Mar. 28, 2018.

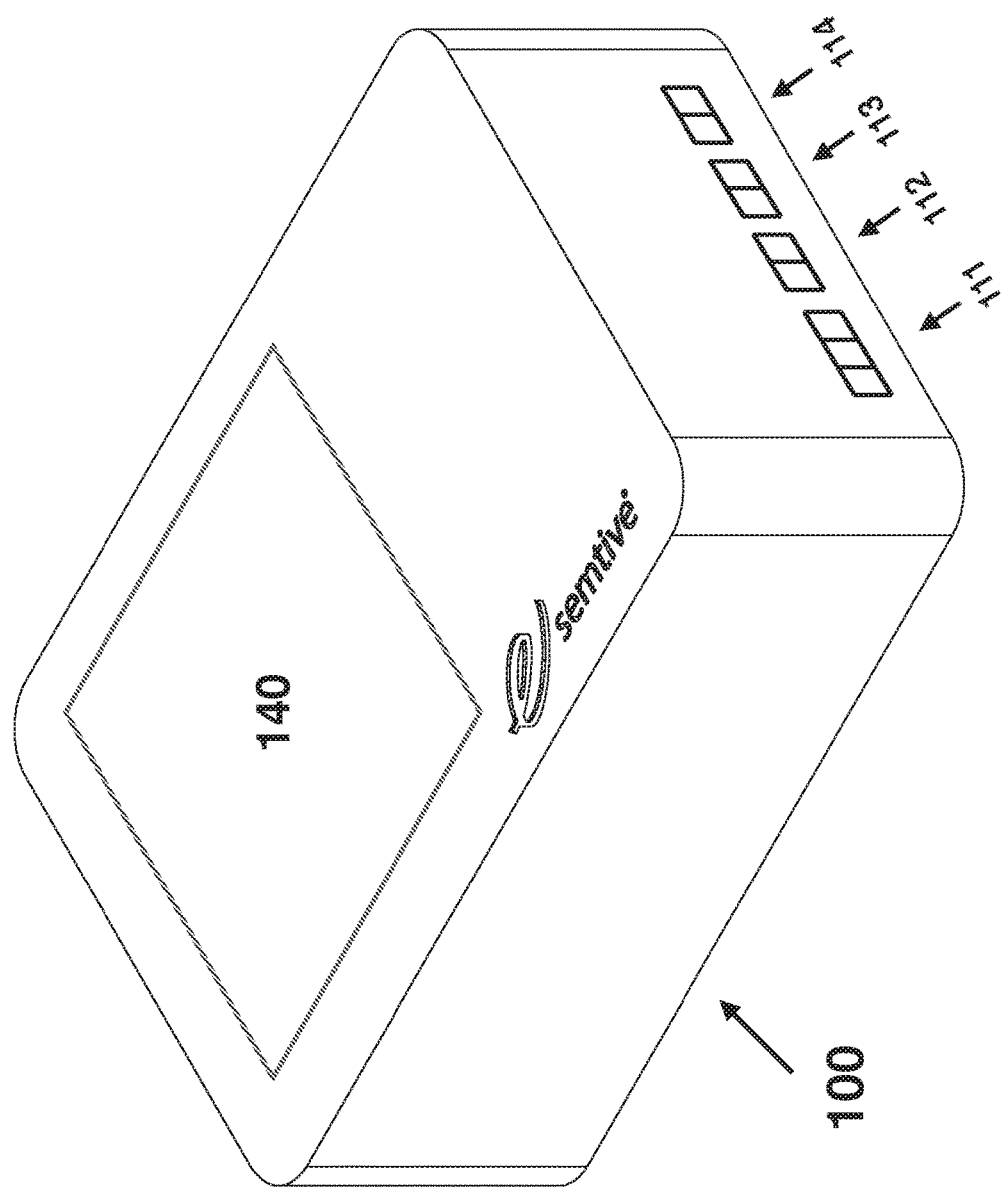
Fig 1.A

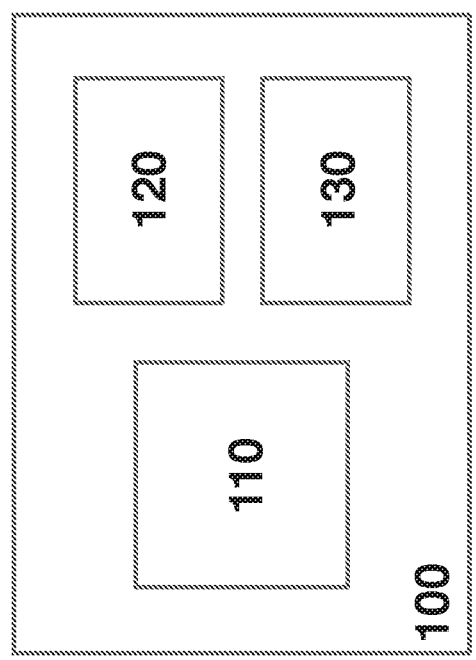
Fig 1.B

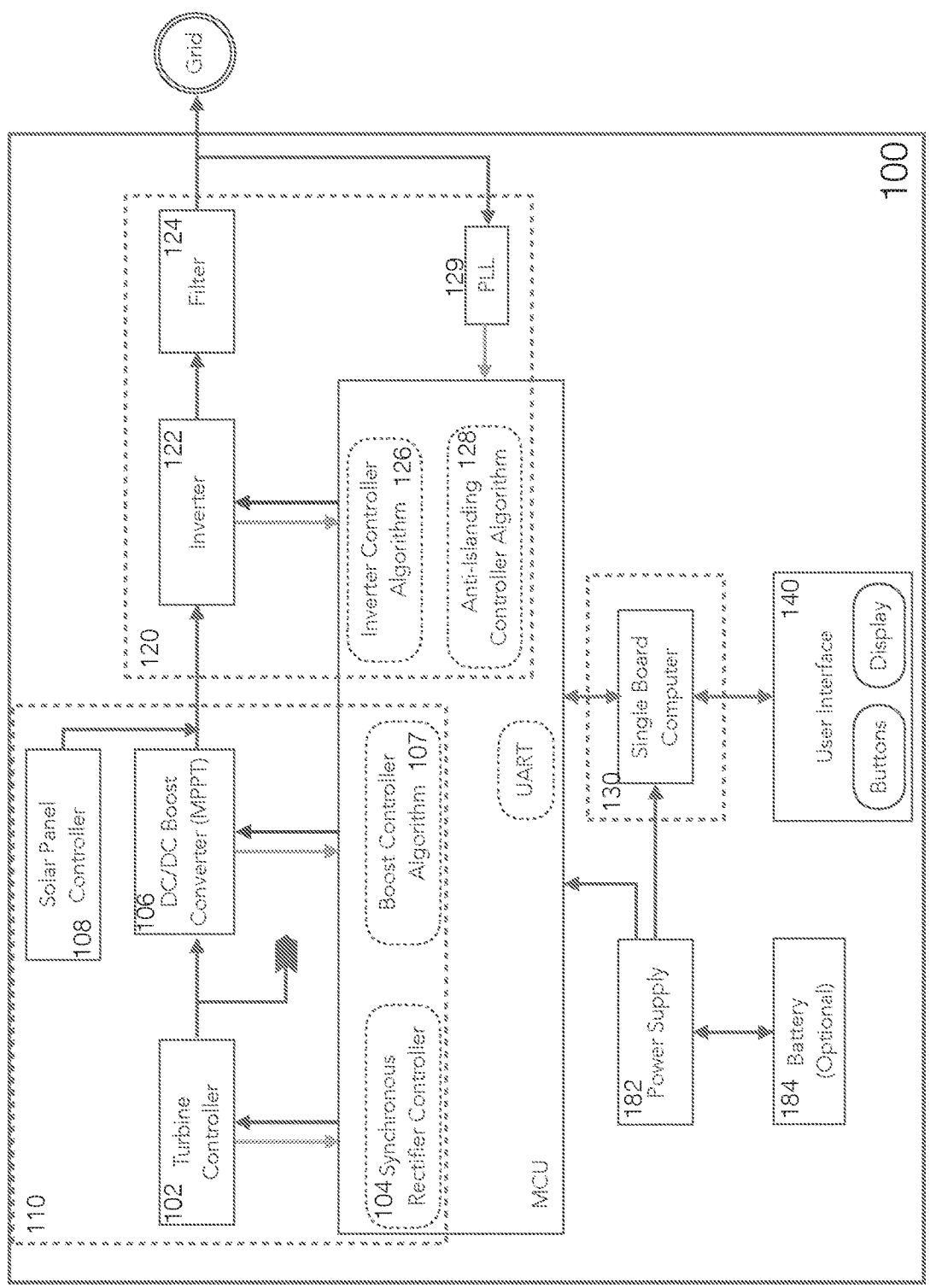
Fig 1.C

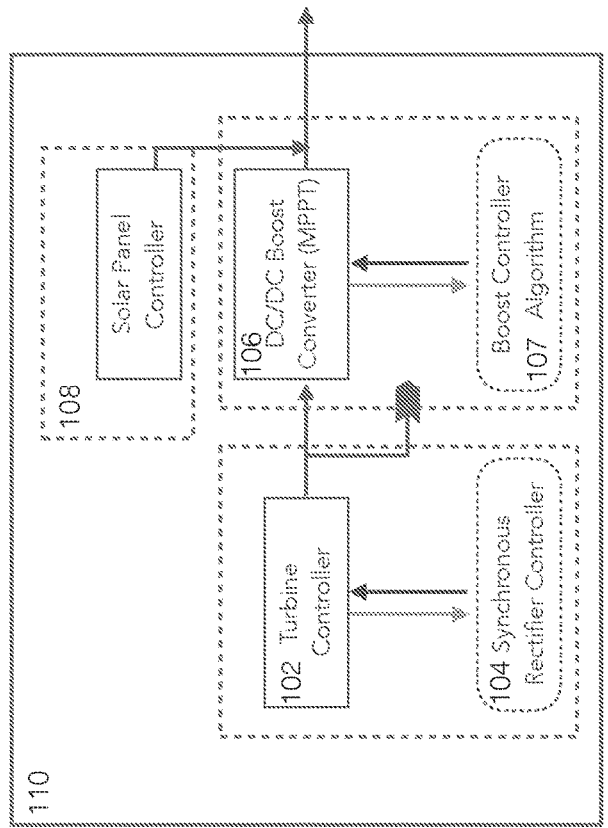
Fig 1.D
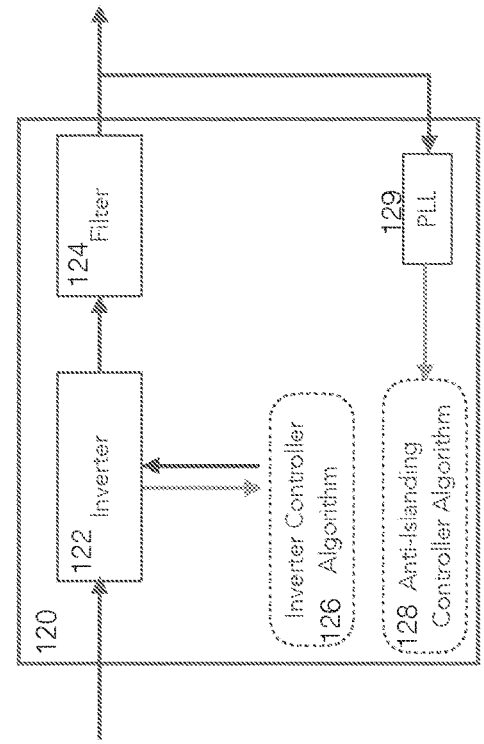
Fig 1.E

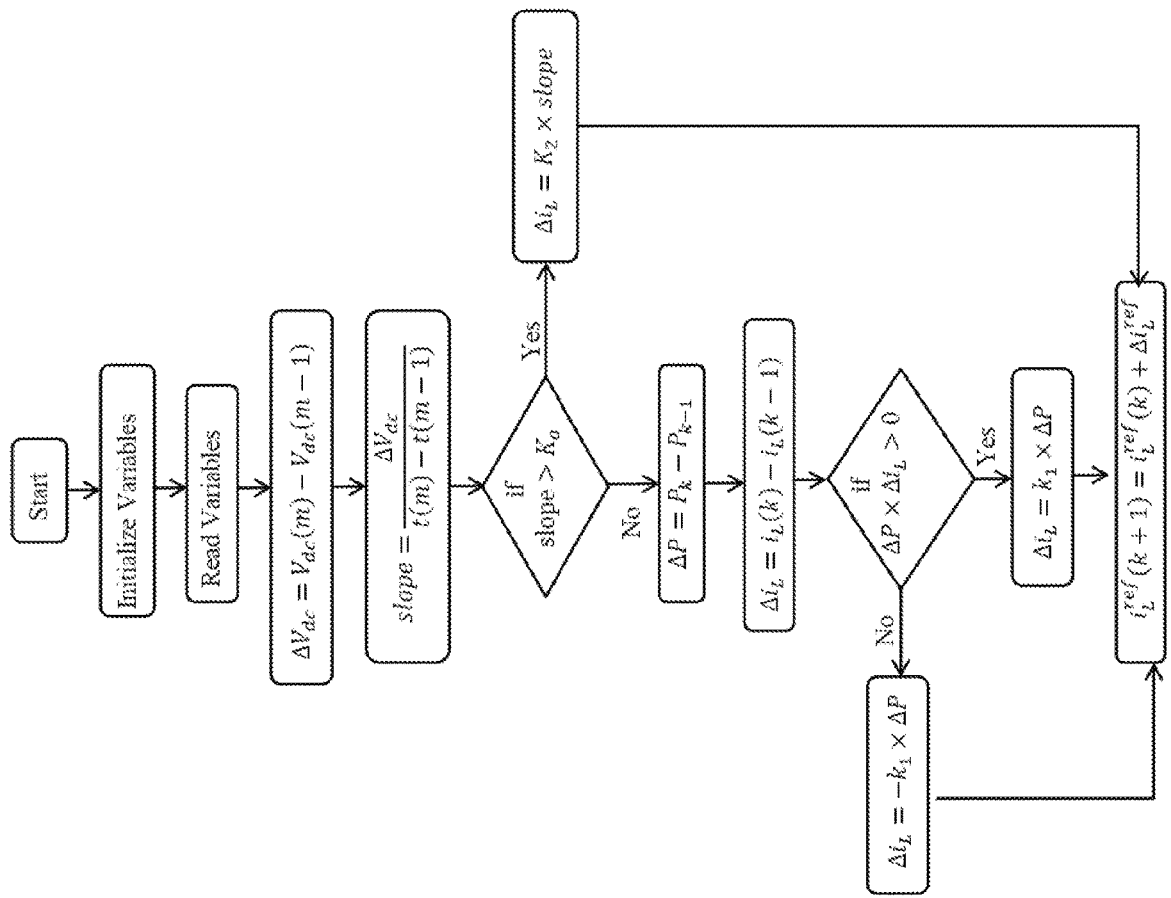
Fig 1.F

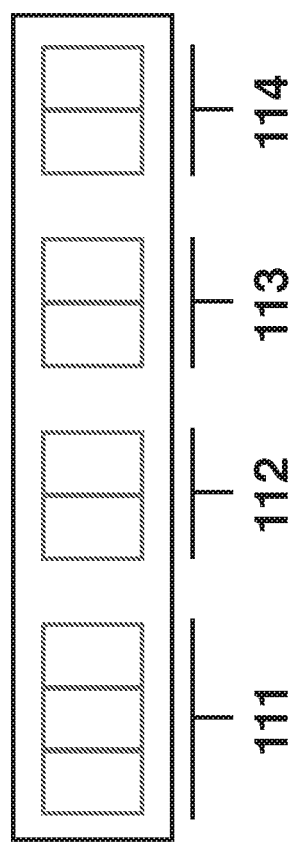
Fig 1.G

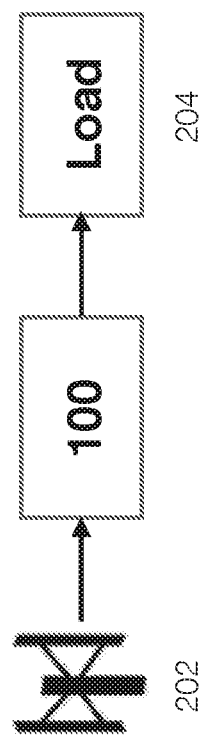
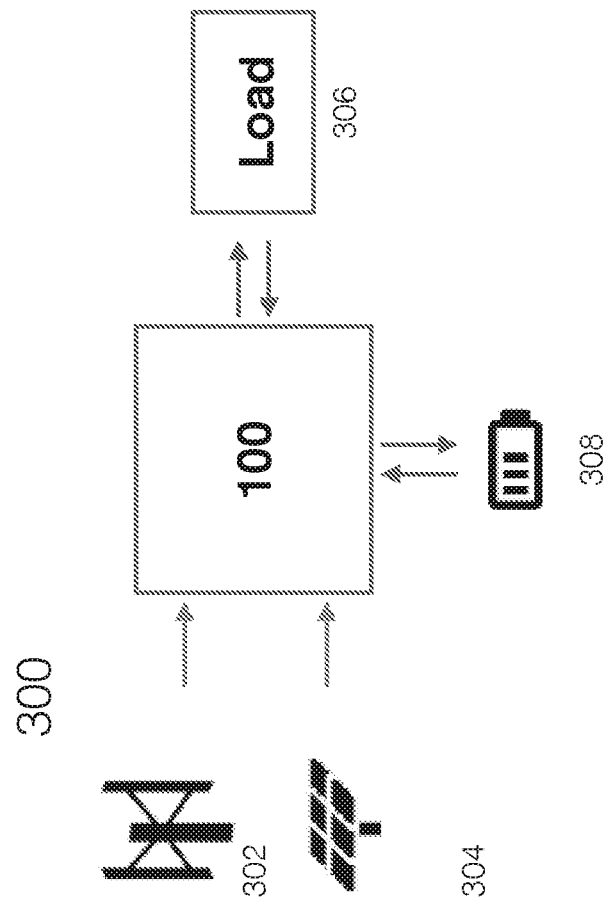

Fig 3.B
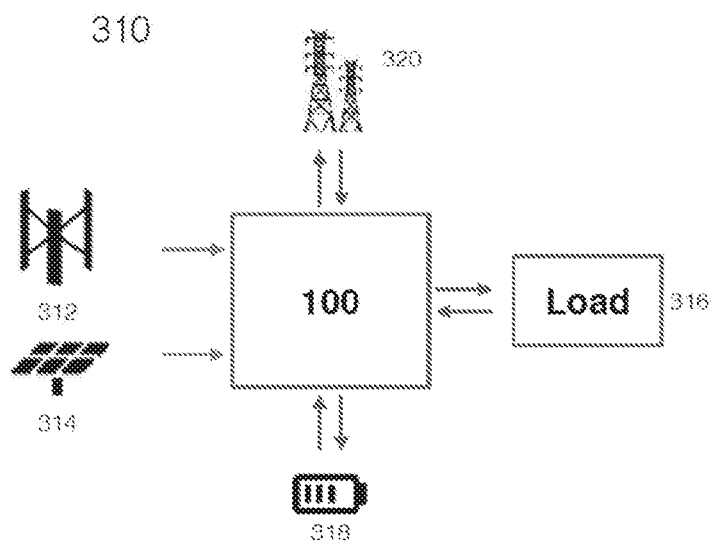
Fig 3.C
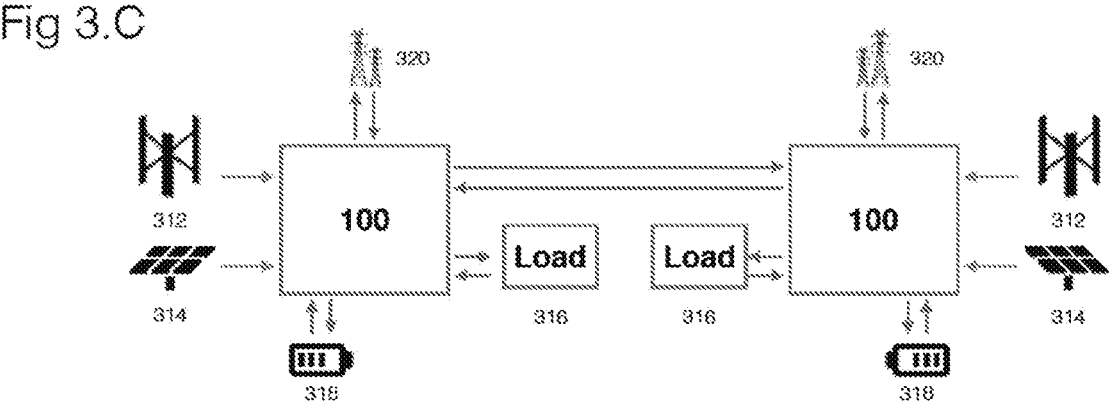

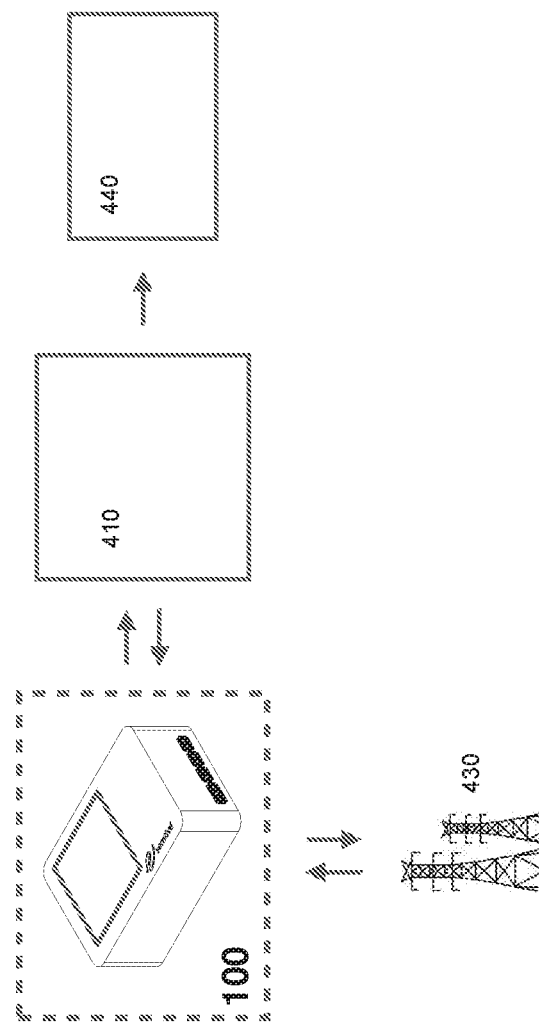

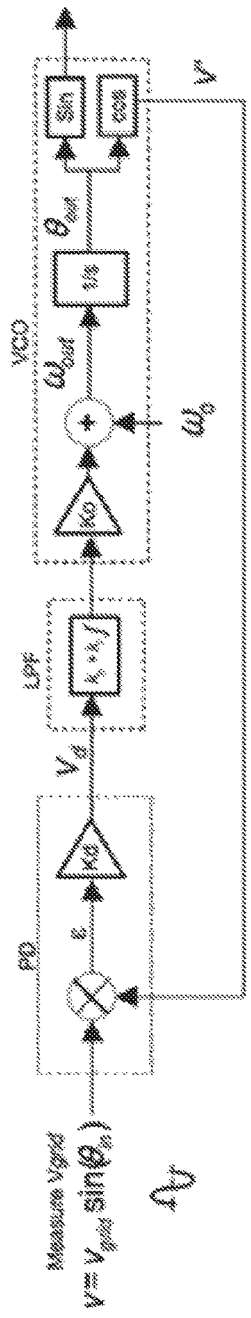
Fig 5
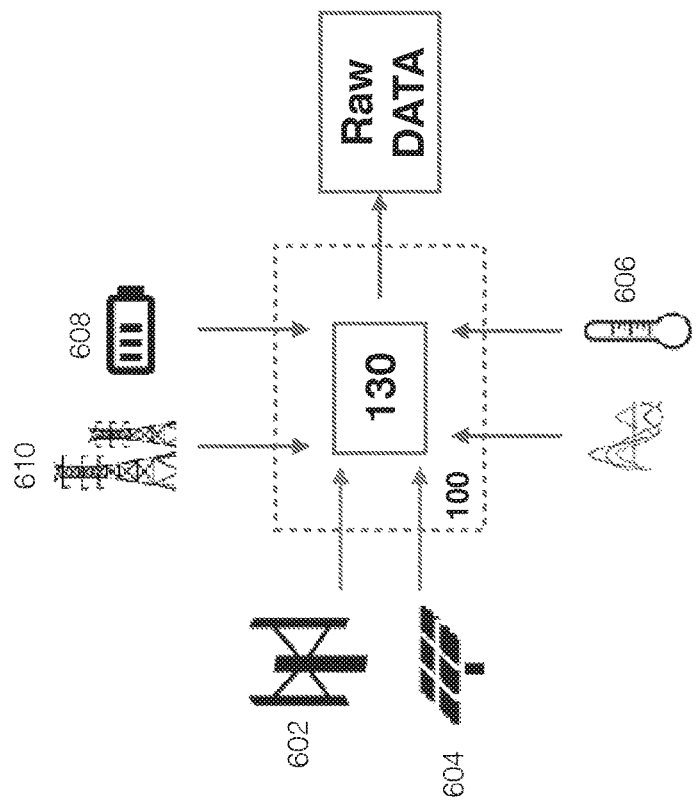
Fig 6.A

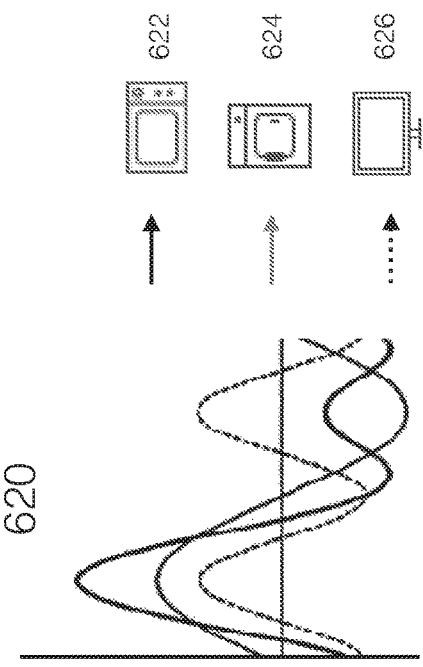
Fig 6.B
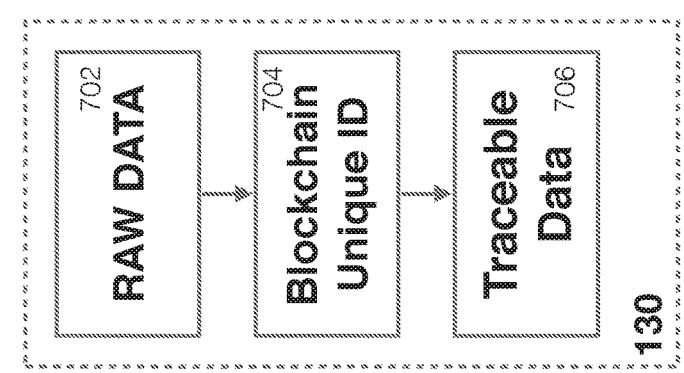
Fig 7

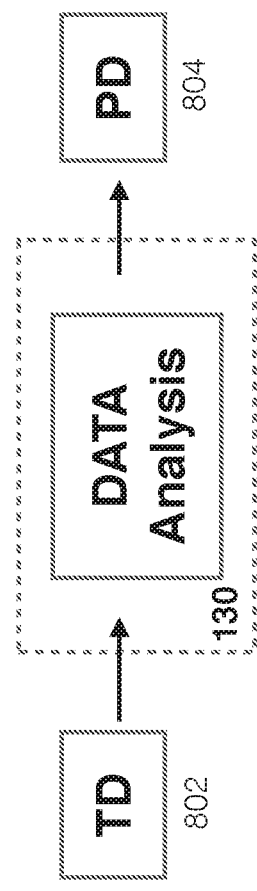
Fig 8
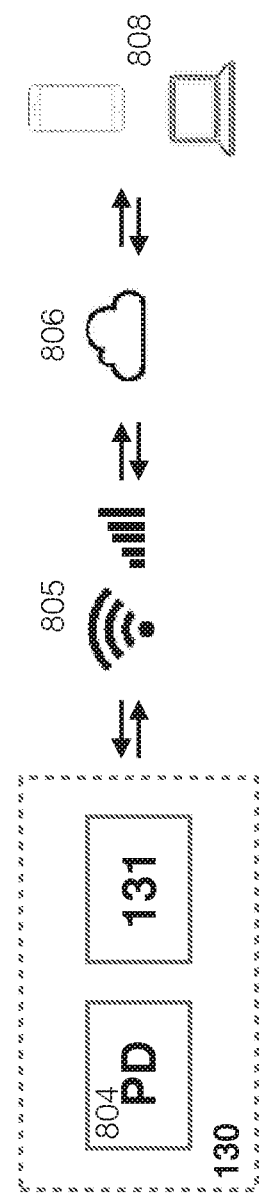
Fig 9.A

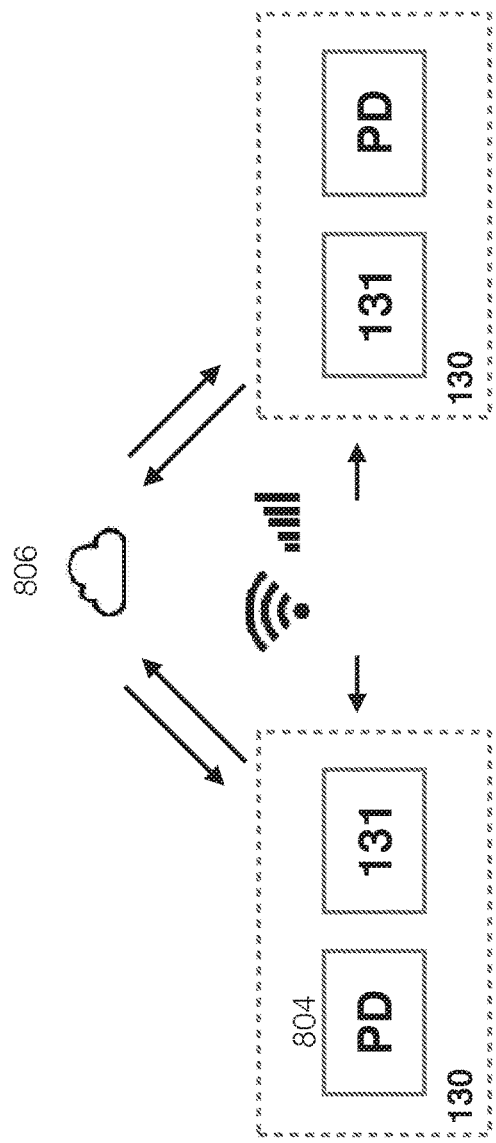
Fig 9.B
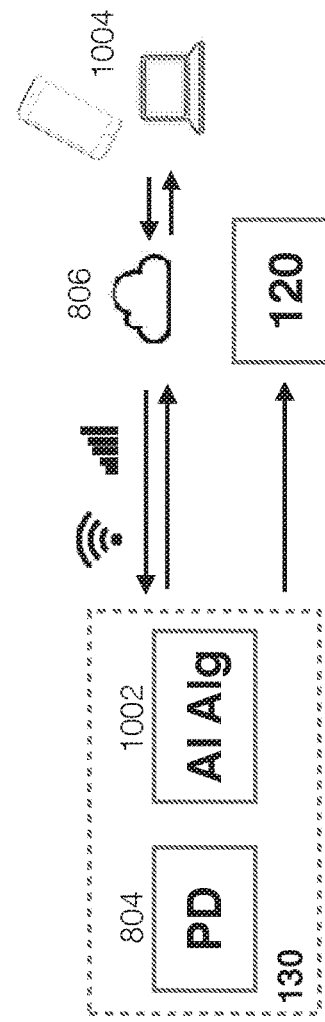
Fig 10.A

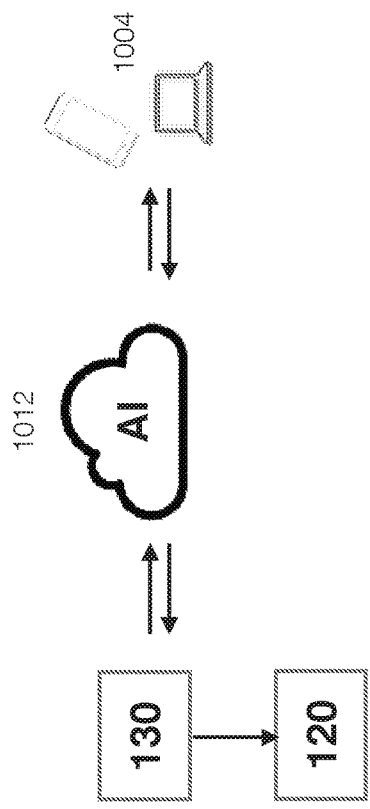
Fig 10.B
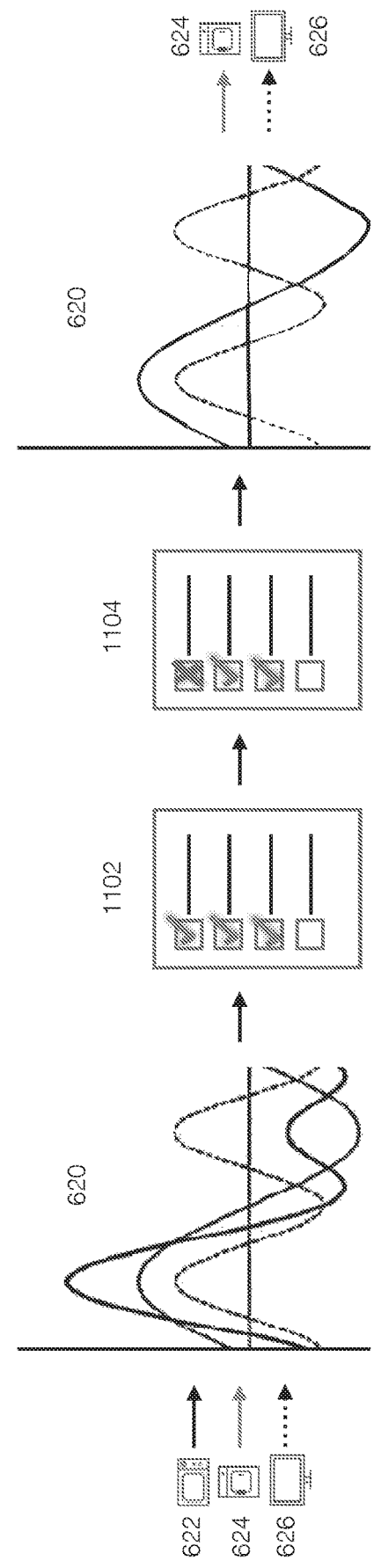
Fig 11.A

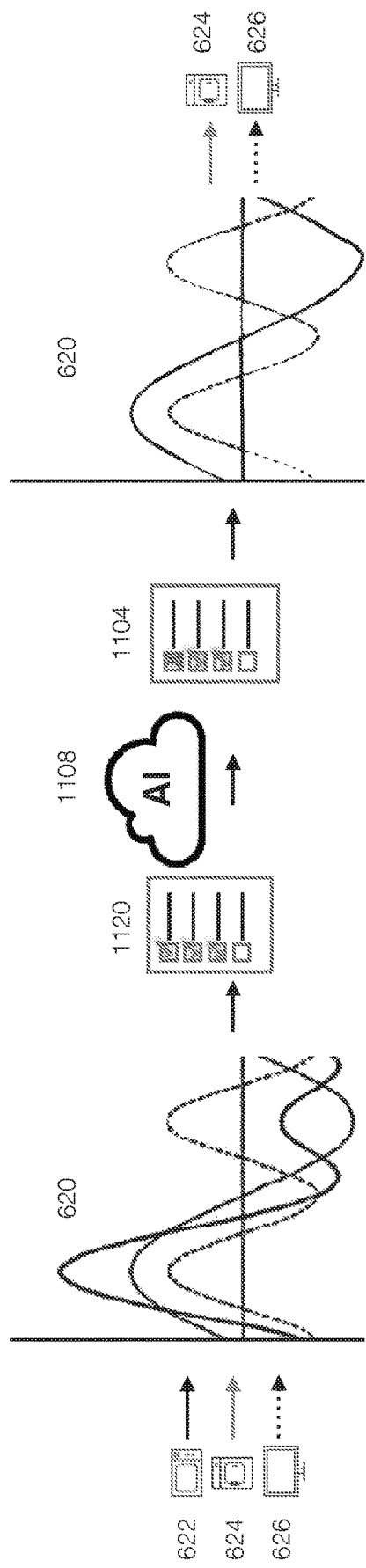
Fig 11.B
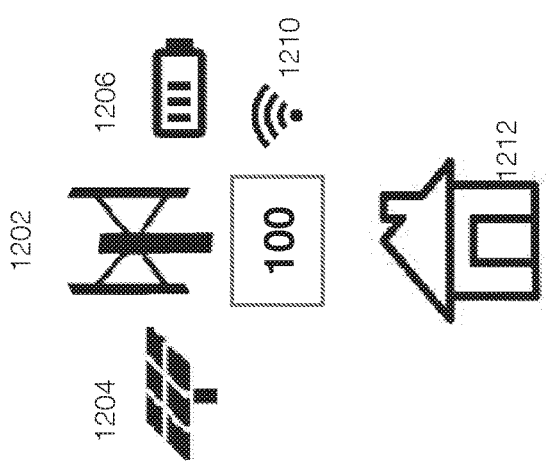
Fig 12.A

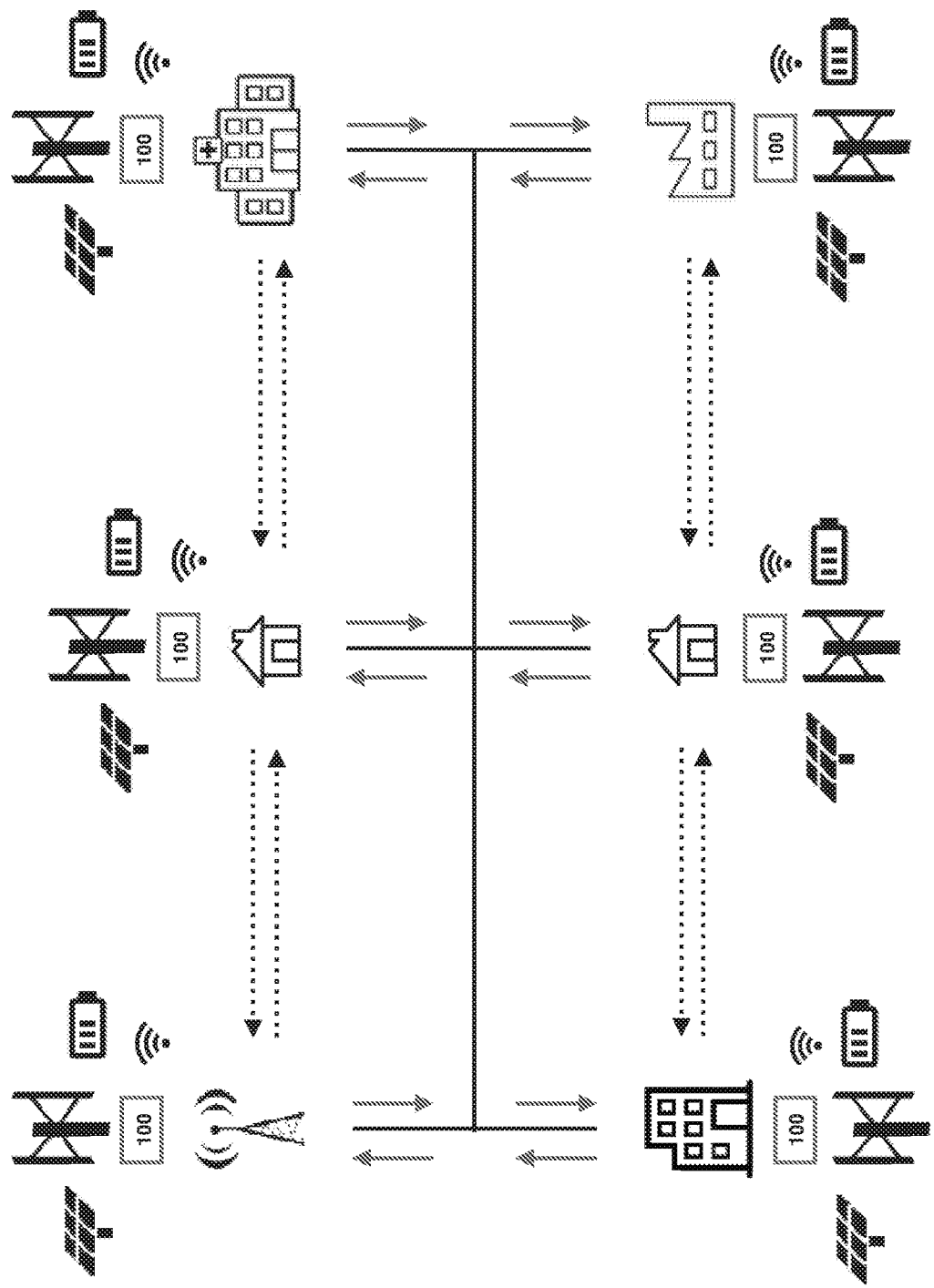
Fig 12.B

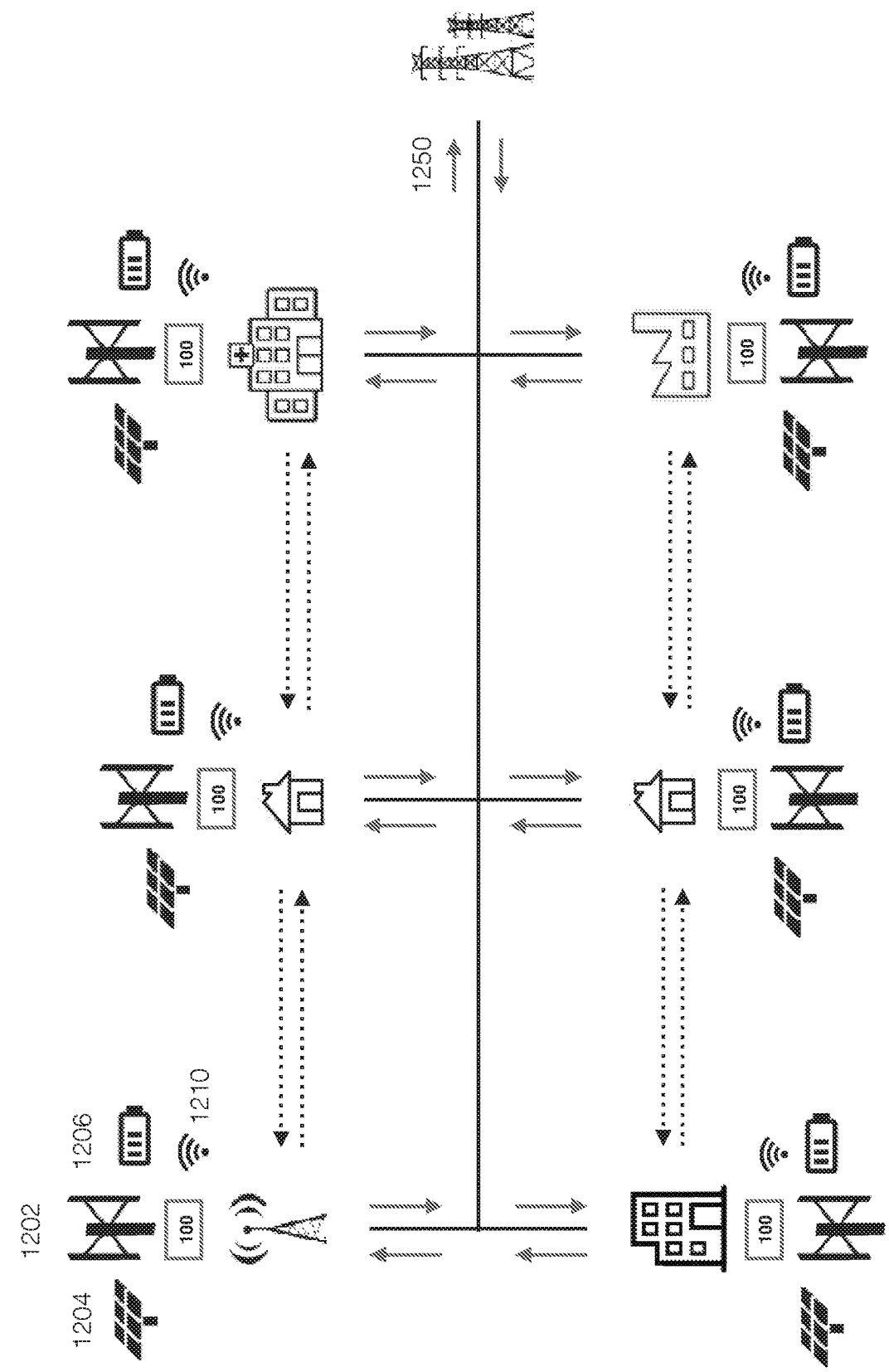

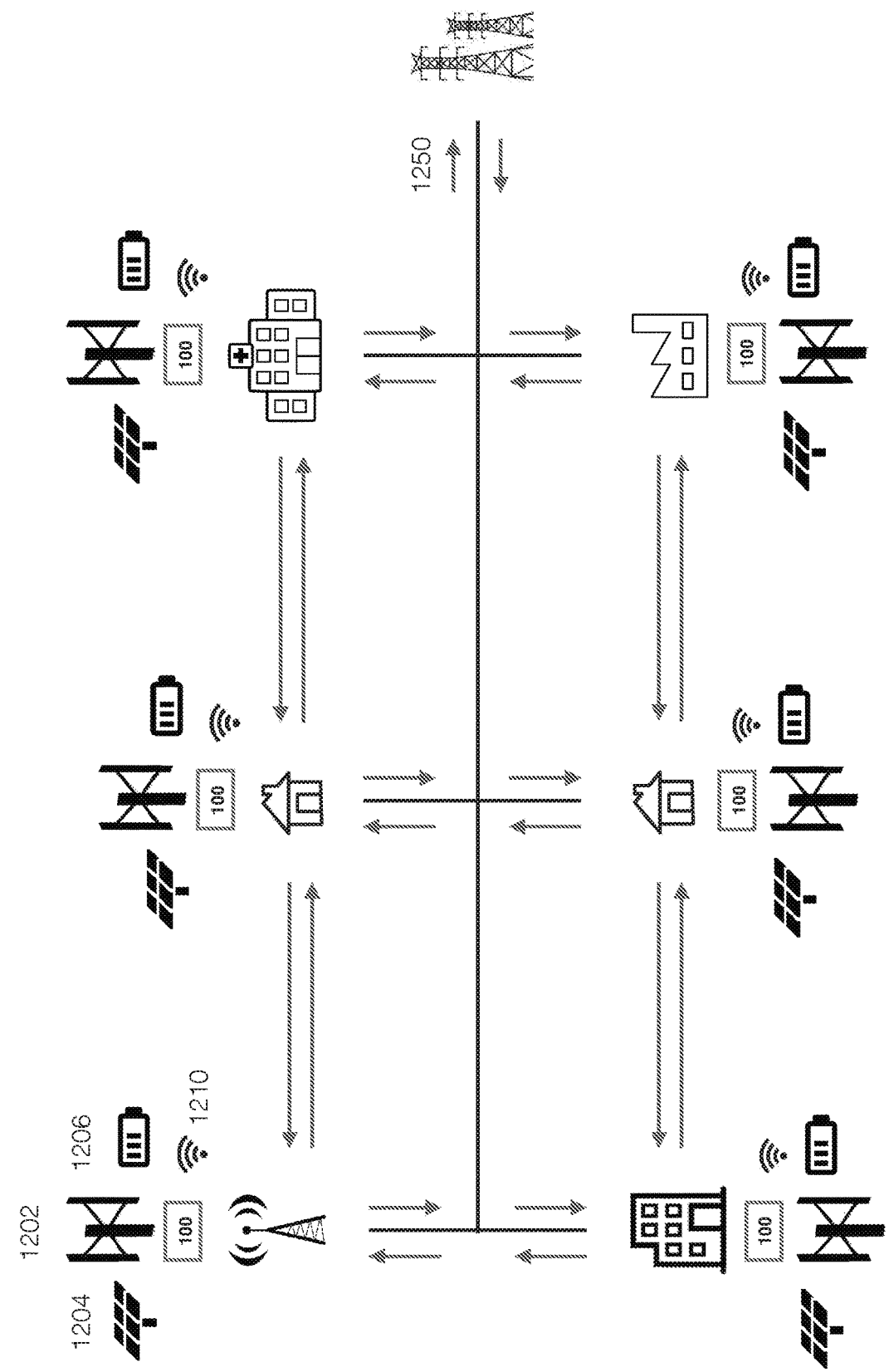
Fig 12.D

MICRO INVERTER AND CONTROLLER

CROSS REFERENCE TO RELATED APPLICATIONS

This application claims the benefit of U.S. Provisional Patent Application No. 62/730,463, filed Sep. 12, 2018, the entire disclosure of which is incorporated by reference herein for all purposes. This application is related to U.S. Provisional Patent Application Ser. No. 62/472,469 titled "Micro Inverter and Controller" filed on Mar. 16, 2017, and International Application No. PCT/US2018/022811, filed Mar. 16, 2018, the entire disclosure of which is incorporated herein by reference in its entirety for all purposes.

INCORPORATION BY REFERENCE

All publications and patent applications mentioned in this specification are herein incorporated by reference to the same extent as if each individual publication or patent application was specifically and individually indicated to be incorporated by reference.

FIELD

The present invention relates to a renewable energy inverter, in particular, to an all-in-one controller and micro-inverter with data gathering, analysis and connectivity capability.

BACKGROUND

Micro-inverters offer a means for providing ready-to-use alternating current (AC) at the point of an energy source, which makes them attractive for distributed energy generation systems of varying capacities such as wind or solar energy systems. Micro-inverters offer the added advantages of modularity, maximum power efficiency, real-time optimization, and superior means for monitoring and control of the overall system. Micro-inverters offer these benefits with minimal changes to the existing wiring in a building. Because of these benefits the use of micro-inverters are on the rise year to year.

As global concern for the environment and energy sustainability grows, the prevalence of solar power, wind power and other renewable energy sources has increased correspondingly. Renewable decentralized power generation systems typically include two major parts: power generators that produce the power, and inverters that receive, condition, and inject the power into the power load. Power generators include, for example, photovoltaic (PV) cells and wind turbines, small hydro turbines, and biomass & gas systems. As a result, a need remains for improvements to decentralized power generation systems.

SUMMARY OF THE INVENTION

In general, in one embodiment, a self-contained electrical box configured to convert two or more dissimilar electrical inputs into a single electrical output includes a maximum power point tracking (MPPT) controller, an inverter under control of a microprocessor and an electrical connector. A first electrical connector, a second electrical connector or a third electrical connector is in communication with the MPPT controller or the inverter. An electrical output from the inverter or the MPPT controller is based on an electrical input to the first electrical connector, the second electrical connector or the third electrical connector.

This and other embodiments can include one or more of the following features. The input to the first electrical connector, the electrical second connector or the third electrical connector can be from 12V to 450V. The electrical input to the first electrical connector, the second electrical connector or the third electrical connector can be an AC electrical signal or a DC electrical signal. The electrical input to the first electrical connector, the second electrical connector or the third electrical connector can be a single phase or 3 phases. The MPPT controller can be a programmable MPPT controller. The programmable MPPT controller can further include computer readable instructions to receive, optimize and manage electrical inputs from the first electrical connector, the second electrical connector or the third electrical connector provided from a wind turbine and a solar panel or any other variable output generator. The self-contained electrical box can further include an electrical connector for communication with an energy storage device. The inverter can be adapted to deliver energy to an AC electrical load in communication with the electrical output of the self-contained electrical box. The self-contained electrical box can be adapted and configured to receive inputs from one or more sensors or one or more electrical signals from an electrical generator connected to the first, the second or the third electrical connector to gather data related to meteorological conditions at the electrical generator providing the information. The self-contained electrical box can be adapted and configured to receive inputs from one or more sensors and electrical signals from an electrical generator connected to the first, the second or the third electrical connector to gather information regarding the performance, operation or characteristic of the electrical generator providing the information. The self-contained electrical box can further include computer readable instructions performed by the microprocessor to analyze electrical signals and gather information regarding grid energy use. The self-contained electrical box can further include computer readable instructions performed by the microprocessor to analyze electrical waves signals and to gather information about the use and consumption or specific electrical signature from appliances and devices in the same network. The self-contained electrical box can further include computer readable instructions to uniquely identify and to trace electronically each parameter gathered by operation of the self-contained electrical box or for implementation of a blockchain technology to electronically sign each parameter gathered during operation of the self-contained electrical box. The self-contained electrical box can further include a communication module for connection to a platform to send information using communication technologies like WIFI or GSM. The self-contained electrical box can be adapted and configured for remote connection to another self-contained electrical box using communication technologies like WIFI or GSM. The self-contained electrical box can further include computer readable instructions for the microprocessor to process the gathered information. The self-contained electrical box can further include computer readable instructions related to using one or more algorithms, or an artificial intelligence process to analyze the information gathered during use of one or more of the self-contained electrical boxes. The self-contained electrical box can be adapted and configured for connection to an electrical load wherein the electrical outlet can be configured for coupling to a conventional electrical female socket. The self-contained electrical box can be adapted and configured for connection to an electrical load wherein the electrical outlet can be configured for coupling to a conventional load center. The self-contained electrical box can be adapted and configured to control the use of the energy and the electrical waves signals from the analyzed information. The self-contained electrical box can be adapted and configured for operation in a stand-alone or off grid electrical system. The self-contained electrical box can be adapted and configured for operation as a part of a micro-grid. The self-contained electrical box can be adapted and configured for operation as a grid-tie system. The self-contained electrical box can be adapted and configured for connection to an electrical load wherein the electrical outlet can be configured for coupling to another self-contained electrical box as a by-pass micro-grid in a conventional grid-tie configuration. The self-contained electrical box can be adapted and configured for connection to manage and transfer energy to and from other self-contained electrical box connected to the same grid.

In general, in one embodiment, a device for transferring energy from a power generator, includes a controller configured to receive and stabilize power received from one or more power generators and output direct voltage, a microinverter configured to receive and modify a direct voltage signal and output an alternating current, the microinverter configured to be plugged directly into a standard power outlet or to the load center, and a communications module configured to gather data from the controller and microinverter and upload the data to a cloud platform.

In general, in one embodiment, a method of providing a single electrical power output from two or more different electrical inputs includes: (1) receiving a first electrical power signal from a first electrical power source and a second different electrical power signal from a second electrical power source; (2) processing the first and the second power signals to provide a single electrical output; and (3) providing the single electrical output to a standard female power outlet or load center.

This and other embodiments can include one or more of the following features. The first electrical power signal and the second electrical power signal can be selected from a three phase AC power source, a single phase AC power source or a DC power source. The first power source or the second power source can be provided by a turbine driven by interaction with wind or water. The first power source of the second power source can be a photovoltaic system. The first electrical power signal and the second electrical power signal can be processed to provide a unique signature and certification for tracing the power provided from the first electrical power source and the second electrical power source. The single electrical output can be provided to a storage device. The method can further include a third electrical power signal. The first electrical power signal, the second electrical power signal or the third electrical power signal can be from 12V to 450V. The first electrical power signal, the second electrical power signal or the third electrical power signal can be an AC electrical signal or a DC electrical signal. The first electrical power signal, the second electrical power signal or the third electrical power signal can be a single phase or 3 phases. The method of the processing step can further include operation of a programmable MPPT controller having computer readable instructions to receive, optimize and manage electrical inputs from the first electrical power signal, the second electrical power signal or the third electrical power signal provided from a wind turbine and a solar panel. The method can further include computer readable instructions for providing the single electrical output in a form acceptable to an energy storage device. The method of the processing step can further include operation of an inverter adapted to deliver the single electrical output to an AC electrical load. The method can further include processing steps adapted and configured to receive inputs from one or more sensors or one or more electrical signals from a first electrical generator, a second electrical generator or a third electrical generator; and gathering data related to meteorological conditions at the first, the second or the third electrical generator providing the information. The method can further include processing steps adapted and configured to receive inputs from one or more sensors and electrical signals from an electrical generator providing the first, the second or the third electrical signal to gather information regarding the performance, operation or characteristic of the electrical generator providing the information. The method can further include processing steps having computer readable instructions to analyze electrical signals and gather information regarding grid energy use. The method can further include processing steps having computer readable instructions to analyze electrical waves signals and to gather information about the use and consumption or specific electrical signature from appliances and devices in the same network. The method can further include processing steps having computer readable instructions to uniquely identify and to trace electronically each parameter gathered or for implementing a blockchain technology for electronically signing each parameter gathered during operations for receiving electrical signals and providing an electrical output. The method can further include communicating to a platform and sending information to a remote computer system. The method can further include computer readable instructions for processing gathered information. The method can further include computer readable instructions related to using one or more algorithms, or an artificial intelligence process to analyze the information gathered by receiving and processing the first, the second or the third electrical signal. The method can further include computer readable instructions adapted and configured to control the use of the energy from the analyzed information. The method can further include processing steps having computer readable instructions to analyze electrical waves signals and to gather information about the use and consumption or specific electrical signature one or more individual electrical appliances or devices in the same network and thereafter, providing controlling functions for the operation of each one of the one or more individual electrical appliances or devices based on operations related to the specific electrical wave signature. The method can further include computer readable instructions adapted and configured to control the use of the energy for operation in a stand-alone or off grid electrical system, as a part of a micro-grid system or a grid-tie system or in a by-pass configuration in a grid-tie configuration. The method can further be configured to communicate with other self-contained boxes to transfer energy between them, using any of the connections systems, as part of a microgrid, grid tie or as a by-pass configuration in a grid-tie application. The self-contained electrical box can further include a display configured to display information, settings, operational parameters, and user preferences related to the self-contained electrical box. The display can be configured as a user interface screen adapted and configured to provide touch screen capabilities for operation of the self-contained electrical box. The method can further include providing information related to providing a single electrical power output on a display. The method can further include interacting with a touch screen operation of the display to manipulate the operations of the steps for providing a single electrical power output. The method can further be configured to exchange energy using P2P (peer to peer) protocols using the grid-tie connection, the microgrid connections or the bypass of the grid-tie connection. The method can further be configured to exchange data using communications protocols to create smart energy auctions.

BRIEF DESCRIPTION OF THE DRAWINGS

FIG. 1A is a perspective view of an embodiment of a micro-inverter.

FIG. 1B is a schematic view of the electronic components of the micro-inverter of FIG. 1A.

FIG. 1C shows a block diagram summarizing the micro-inverter architecture of FIG. 1A.

FIG. 1D shows a block diagram summarizing the MPPT Controller architecture inside the micro-inverter of FIG. 1A.

FIG. 1E shows a block diagram summarizing the inverter architecture inside the micro-inverter of FIG. 1A.

FIG. 1F shows a flow chart summarizing the noted MPPT design approach and algorithm.

FIG. 1G is an enlarged view of exemplary connectors used by the micro-inverter of FIG. 1A.

FIG. 2 is a schematic view of an embodiment of a micro-inverter connected to receive energy from an AC renewable source and deliver energy to an electrical load.

FIG. 3A is a schematic view of an embodiment of a micro-inverter connected in an "off-grid" configuration to receive energy from an AC renewable source and a DC renewable source and to receive/deliver energy to an electrical load and an energy storage device.

FIG. 3B is a schematic view of an embodiment of a micro-inverter connected in an "on-grid" configuration to receive energy from an AC renewable source and a DC renewable source and to receive/deliver energy to an electrical grid, an electrical load, and an energy storage device.

FIG. 3C is a schematic view of the embodiment of the microinverter connected in a "bypass" configuration to receive energy from an AC renewable source and a DC renewable source and to receive/deliver energy to another microinverter, an electrical load, and an energy storage device.

FIG. 4C is a perspective view of an embodiment of a micro-inverter connected to main load center, connected to the grid using the internal transfer switch, to receive, deliver or monitor energy uses.

FIG. 5 is a schematic diagram representing a process for a micro-inverter embodiment to merge existing grid, microgrid, or grid-tied systems permitting supply and receipt of energy when operating in different system configurations.

FIG. 6A is a schematic view of exemplary inputs collected by the microprocessor of a micro-inverter to produce a raw data output.

FIG. 6B is a combined electrical waveform illustrating exemplary different identifiable electrical waveforms associated with different devices.

FIG. 7 is an exemplary process used by the microprocessor to collect raw data as in FIG. 6A, apply a unique identification to the raw data to produce a stream of traceable data linked to a specific micro-inverter.

FIG. 8 is an exemplary process used by the microprocessor receive traceable data perform one or more steps of data analysis to produce a stream of processed data linked to a specific micro-inverter.

FIG. 9A is an exemplary process used by the connectivity board in the micro-inverter to communicate, send and receive processed data linked to a specific micro-inverter to a server, a remote computer, smart devices or other processing systems using communication networks.

FIG. 9B is an exemplary process used by the connectivity boards of two or more micro-inverters to communicate, send and receive process data linked to a specific micro-inverter to another micro-inverter or to a server, a remote computer, smart devices or other processing systems using communication networks.

FIG. 10A is an exemplary process used by the microprocessor of a micro-inverter to utilize built in artificial intelligence with process data linked to a specific micro-inverter to communicate with an inverter of the micro-inverter and to send and receive data with a server, a remote computer, smart devices or other processing systems using communication networks.

FIG. 10B is an exemplary process used by the microprocessor of a micro-inverter in communication with an inverter in the micro-inverter and to an artificial intelligence process performed remotely in a server, one or more remote computer, smart devices or other processing systems using communication networks.

FIG. 11A illustrates exemplary device specific waveform examples as in FIG. 6B that are subsequently processed within a micro-inverter to cut the supply of electricity to one of the devices.

FIG. 11B illustrates exemplary device specific waveform examples as in FIG. 11A that are subsequently processed using an energy utilization algorithm within a micro-inverter or remote to a micro-inverter to subsequently cut the supply of electricity to one of the devices based on the output of the energy utilization algorithm.

FIG. 12A is a schematic illustration of a micro-inverter in an off-grid configuration connected to a solar panel, a wind turbine, an electrical storage device, a communication link and a structure with one or more electrical loads.

FIG. 12B is a schematic illustration of several micro-inverters as in FIG. 12A each connected to a solar panel, a wind turbine, an electrical storage device, a communication link and a structure with one or more electrical loads and each of the micro-inverters connected in a micro-grid configuration allowing P2P energy exchange between the units.

FIG. 12C is a schematic illustration of several micro-inverters as in FIG. 12A each connected to a solar panel, a wind turbine, an electrical storage device, a communication link and a structure with one or more electrical loads and each of the micro-inverters connected to each other using the utility grid, allowing P2P exchange and grid energy feeding using the existing grid.

FIG. 12D is a schematic illustration of several micro-inverters as in FIG. 12A each connected to a solar panel, a wind turbine, an electrical storage device, a communication link and a structure with one or more electrical loads and each of the micro-inverters connected to each other in a bypass array as in FIG. 3C, as well as to a grid, allowing grid energy feeding and back up and using the bypass for energy P2P exchange.

DETAILED DESCRIPTION

Figure 4A:
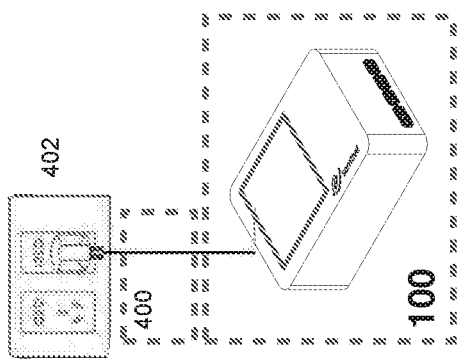
FIG. 4A is a perspective view of an embodiment of a micro-inverter connected to a standard female electrical outlet to receive, deliver or monitor energy uses in communication with the outlet.

Generation usually harvests electric energy as AC or DC. Input DC can be converted to usable AC power using an inverter. Within the inverter, in some embodiments, there are two main sub-circuits, a DC/DC converter followed by a full-bridge inverter. The first sub-circuit is a DC/DC voltage converter that converts the input DC power from the renewable source to a DC voltage that can be used by the subsequent inverter. The second sub-circuit is a DC/AC inverter that converts the DC output of the converter to AC power compatible to the power grid.

In exemplary "off-grid" applications, to provide stable power supply, and "on-grid" tie system, to use as a backup or to reduce grid consumption, energy storage devices can be added to the system. These embodiments can be connected between them, using a bypass connection, and still be grid-connected (or isolated, in some embodiments) to be use in a P2P energy exchange without feeding energy to the utility grid. Embodiments of the micro-inverters described herein are compatible with any of a variety of different energy technologies like lead acid batteries, lithium ion technology batteries and fuel cells.

Embodiments of the present invention overcome the challenges presented wherein these energy storage devices require a separate controller or inverter if they are connected to a grid tie solution or off grid applications. At the same time, embodiments of the inventive micro-inverter provide solutions that can work with both AC/DC storage device types in a nimble way.

In conventional systems, independent control and power extraction is typically required for each power generator in order to increase the overall efficiency of power generators under different conditions. Varying load conditions include changing wind conditions on wind turbines, partial shadowing of PV cells, or mismatches between PV cells. Conventionally, such mismatches requires use of a separate inverter, i.e., a "micro-inverter," for each power generator. Power extraction from each power generator may be enhanced if each power generator performs maximum power point tracking (MPPT) independently. In contrast to conventional systems, the inventive micro-inverter includes capabilities for independent control and power extraction for two or more dissimilar power inputs (see FIG. 1C).

Conventional MPPT systems often use an algorithm based on trial and error, seek and find, or logical and relational operators, that finds the best operating point and creates a MPPT reference signal. However, such an approach may lead to oscillation around the optimum point, which adversely impact the overall efficiency of the system. Moreover, trial and error approaches degrade efficiency for fast changing conditions. This drawback and the low speed characteristic of such approaches may be problematic in conditions such as monotonic and fast increases of the irradiation level, or variable wind conditions. These and other shortcomings of conventional MPPT approaches are overcome by the techniques utilized by embodiments of the micro-inverter described herein.

Wind turbines have gained widespread use for electricity generation in recent years, and one growing market is the small-scale turbine for battery charging or residential use. Small-scale wind turbines typically utilize a permanent magnet alternator to convert the rotational power produced by the turbine rotor into useful electrical power. Permanent magnet alternators have many advantages that make them well suited for use in a wind turbine. Their simplicity, durability, and efficiency are excellent for wind turbine applications.

Permanent magnet alternator power output increases linearly with rotational speed, whereas for a wind turbine to maintain optimum aerodynamic efficiency, the alternator power should increase with the cube of the rotational speed. Designing a wind turbine to operate at maximum efficiency at a design wind speed, while operating at sub-optimum efficiency at all other wind speeds, typically circumvents this problem. The next problem occurs when an alternator is directly coupled to a wind turbine rotor, causing its output to be at a low voltage unless a large number of turns of very fine wire were used in constructing the windings. Using such fine wire results in high electrical resistance and low efficiency.

A permanent magnet alternator typically includes three sets of windings in the stator and the alternator output is three-phase power with varying voltage and frequency. In order to use the output power for battery charging or other useful purposes, the output is typically rectified to direct current (DC) and once again to alternative current (AC) if needed.

While these components are provided as different parts of a renewable system, the required technical skills usually required to install, operate and maintain these disparate systems is now provided using simple connections in the various embodiments of the micro-inverter.

In still other embodiments to address solutions as part of decentralized energy generation, storage and delivery, various embodiments of the micro-inverter may also include communications and connectivity to a remote computing platform or cloud for gathering real-time information related to energy generation, storage, transmission, utilization as well as other aspects of operation and energy management improvements.

In still further micro-inverter embodiments, there is provided capability for managing and analyzing energy data. In one aspect, there is provided one or more algorithms to analyze energy information either within a micro-inverter or using remote computing systems. In still other embodiments, there is provided an artificial intelligence systems allowing the individual or connected micro-inverters to become smart, including decision making processes within certain parameters or as determined by one or more energy generation protocols, energy supply protocols, energy delivery protocols, device utilization protocols or energy storage protocols alone or in combination.

In still further embodiments, the energy collected, stored, shared, received or processed by a micro-inverter is provided with a unique identifier. In one embodiment, the processor of a micro-inverter generates an electronic signature sufficient to identify each system and to provide traceability for energy interactions with a specific micro-inverter. In one aspect, the electronic signature is provided by a block chain enabled system. In another aspect, each micro-inverter is adapted and configured to have validation on every value generated, and traceability in the transaction of those assets.

FIG. 1A is a perspective view of an embodiment of an all in one micro-inverter device. A single box that contains all the different components from the Micro-Inverter 100. The micro-inverter 100 includes a user interface screen 140 that can show the settings and operational parameters and other information concerning the Micro-Inverter 100. Additionally or optionally, the user interface screen 140 can be configured as a touch screen, a high definition display or a full size separate display depending upon configuration and user preferences. Also shown in FIG. 1A are exemplary electrical connectors 111, 112, 113 and 114 of the controller (See FIG. 1C).

FIGS. 1B and 1C are schematic views showing the internal components of the Micro-Inverter 100. Shown in FIG. 1B, the Micro-Inverter 100 comprises a MPPT controller 110, an inverter side 120 and a microprocessor 130. The MPPT controller 110 is where the multiple, dissimilar generating source inputs, for example, wind turbines, hydro turbines or solar panels are connected. Voltage and electric current are modified or rectified when needed to optimize the MPPT 110 output.

FIG. 1C illustrates a more detailed view of an embodiment the Micro-Inverter 100. The controller 110 comprises a turbine controller 1-2 and a solar panel controller 108. The controller 100 can also comprise a synchronous rectifier controller 104, a DC/DC boost converter 106 and a boost controller algorithm 107. The inverter side 120 comprises an inverter 122 and a filter 124. The inverter side 120 can comprise a inverter controller algorithm 126, an anti-islanding controller algorithm 128, and a PLL block 129. The micro-inverter 100 comprises a processor 130. The micro-inverter 100 can also comprise a user interface 180. The micro-inverter 100 can be connected to a power supply 182 and can also optionally comprise a battery 184.

All control signals driving the power train stages are coordinated by the microcontroller 110, which can also run the MPPT algorithms for maximizing power production. The microcontroller 110 can also monitor key voltages and currents to determine production output. Key safety events such as grid disconnect can be monitored to take appropriate actions such as shunting power to the dump load circuitry. The microprocessor can sense both controllers outputs, choosing the best source and limiting the output to safely manage the inverter. For conventional socket feed in, the inverter can be limited to about 1.5 kW continuous output power. Full power from the input sources can be achieved connecting the embodiment to the main load center. The microprocessor can work as follows: The microprocessor can optimize the input from different sources, for example, using a combination of both to reach the 1.5 kW full input capacity of the inverter. In the case that the energy generation exceeds the 1.5 kW limit, excess energy can be diverted to the storage device. In the case that the energy generation exceeds the 1.5 kW limit and the storage device is fully loaded, the microprocessor can divert the energy into the dump load (Capacitor or resistor) or slow generation at the sources, by, for example, shorting input leads or opening the circuit. If the renewable sources are not generating enough power to supply the inverter, the system can be set for one of 3 different configurations. The first configuration can be to use the storage device to supply the differential energy, and once consumed, use the grid connection. The second configuration can be to set the system to not use the storage until there is a power outage from the grid, and to use the storage device as a back up system to feed internal consumption. In this second configuration, the controller should be able to disconnect itself form the grid and work as an independent off-grid inverter. The third configuration can be to set a discharge value so the system can use part of the energy storage to reduce grid consumption. Once the limit is reached, the load can be covered by the external grid. The remaining storage level can be used only in case of a grid outage as a back up solution.

FIG. 1D shows a block diagram summarizing the MPPT Controller 110 architecture. The Turbine controller 102 comprises an active rectifier 104 that accepts three-phase alternating current inputs from the PMG and rectifies each phase through an active bridge to improve the efficiency of this conversion stage. The output from this part of the design is DC voltage input to the boost converter stage. The PMG input should be designed for high 220/380 VAC range, depending on the output, to minimize relative losses through rectifier diodes in this stage and alleviate subsequent boost converter requirements.

The DC/DC Boost Converter 106 design uses a classic boost converter that accepts the rectified DC voltage and scales that up to an optimal DC value (e.g., about 230 to 260 V), for the 110 VAC output version, or roughly twice that DC value for the 220 VAC output version for driving the inverter stage. Maximum Power Point Tracking (MPPT) implemented in the Boost control algorithm 107 adapts the converter stage load current to yield the maximum power transfer out of the wind turbine. The solar Panel Controller 108 accepts solar DC input and maximizes the performance output from the solar panel.

This output from the MPPT controller 110 is the input of the Inverter side 120. The inverter 120 converts the current to AC to feed the grid. The Microprocessor 130 includes a set of computer related electrical and electronic components along with computer readable instructions allowing the system to communicate using different protocols, analyze and process the data and transfer it to a server and be stored in the cloud.

The input for the MPPT controller 110 can vary from 12V to 450 V, depending on the source, the model, and type of energy power unit. The current output from the controller 110 can be direct or alternating. The controller 110 rectifies the voltage to stabilize the waves and amplitudes from unstable sources. The DC current from the MPPT controller 110 feeds into the inverter 120 side of the system.

The inverter 120 modifies the current from DC to AC, with outputs from 110V to 380V and 50 Hz or 60 Hz depending on the models.

FIG. 1E shows a block diagram summarizing the micro-inverter 120 architecture. The micro-inverter 122 accepts stable DC current from Controller outputs to generate a modulated signal equal to the RMS value of the output voltage. Software controls the frequency of the output and synchronizes current for injection into the grid (described in further detail below in the description of inverter/controller grid operation). A filter 124 (e.g., an LCL low-pass filter stage) can be used to manage emissions from the design to enable passing FCC Part 15 Class B requirements. The filtering function here also improves the Total Harmonic Distortion (THD) performance of the design to meet grid requirements. The inverter can also use Anti-islanding protection 128, in which the inverter uses a Zero-Cross detection and PLL block 129 to detect Islanding conditions and provide protection for the system.

The micro-inverter system recognizes and adjusts itself to different energy input sources considering types of currents and voltages, making it nimble and versatile.

FIG. 1F shows a flow chart summarizing the noted MPPT Design approach and algorithm. The MPPT design approach uses an adaptive step size Perturb and Observe (P&O) control of boost output current to handle slower to normal wind variations. In addition, the MPPT design also overlays a predictive mode capability to override the normal P&O step sizes when sudden wind variations exceed a threshold monitored for active rectifier voltage variations. Such large voltage variations indicate rapidly changing wind conditions that leave the normal adaptive step size changes too small to respond in time. This is particularly important for a Vertical Axis Wind Turbine (VAWT) design that catches wind variations from all directions and presents very dynamic conditions to the inverter design. The enhanced predictive mode enables the MPPT design to windstand extreme wind variations and continue to ride the maximum power point tracking curve by providing constant production in such turbulent situations. The algorithm can start by initializing variables and reading the variables at box. The variables can be used to calculate a change in DC voltage.

In some embodiments, the first thing the MPPT algorithm can check is the voltage slope at the active bridge rectifier output to determine whether the turbine is experiencing a sudden gust, comparing this voltage slope to the K0 threshold for overriding normal Perturb and Observe (P&O) control mechanism. If the voltage slope exceeds this threshold, then the algorithm uses the K2 constraint for greater adjustments to the output current from the boost converter output.

If the voltage slope is less than K0, then the MPPT algorithm performs the normal Perturb and Observe (P&O) adjustments based on K1 constant to the current output from the boost converter stage holding capacitor. These are adaptively adjusted to converge to the MPPT point on the curve for maximum power conversion. These adjustments work fine when the wind speed changes are slow to normal conditions not requiring large adjustments. The algorithm has been optimized for K0, K1, and K2 primary mechanisms for governing changes to the boost converter output current, which in turns controls the power conversion. Tuning these provides a broad dynamic range for changing wind conditions to assure maximum power harvest by tracking the MPPT point throughout. This design approach overcomes limitations of other commercially available inverters, which frequently are unable to track sudden wind changes and stop producing power until the MPPT algorithm is able to recover and "find" the MPPT tracking point again.

FIG. 1G is a detailed view of the input side of the micro-inverter 100. Advantageously, several different connectors can be readily connected to and subsequently recognized by the MPPT controller 110. Connector 111 is an AC three-phase connector from wind turbine or other alternators, like small hydro turbines, that can produce AC. The connector 112 is a DC connector from solar panels or other DC sources. The connector 113 is an AC single-phase connector that can be used by any kind of AC single-phase source, like AC solar panels. Connector 114 is a DC/AC storage connection that allows the controller to charge battery banks and use them as backup or storage to draw energy to boost output. This connector adjusts itself to different storage devices, like lead acid batteries, lithium ion technology batteries. Additionally or optionally, the micro-inverter 100 includes hardware and software or instructions for operations with energy storage devices having built in charge management software. In still other configurations, a micro-inverter 100 may be configured to send or receive energy from other energy devices such as fuel cells or electric vehicles.

FIG. 2 shows a diagram of a basic system 200 comprising a vertical axis wind turbine 202 feeding 3 phase energy to connector 111 (not shown) of the Micro-Inverter 100. Components within the micro-inverter 100 optimize the performance of the turbine and provide energy to different loads 204. These loads 204 can vary for different applications: a house, a cell tower, a commercial building, a warehouse, a medical clinic, a hospital, a specialty storage center or other type of energy storage devices. (see FIGS. 12A, 12B and 12C)

FIG. 3A describes an off-grid system 300 managed by a hybrid Micro-Inverter 100. In this diagram each load 306 uses a Micro-inverter 100 connected to an AC 3 phase source (111) and a DC/AC single phase generator (113), such as a wind turbine 302 and a solar panel 304. The Micro-inverter 100 then uses the built in components described in FIGS. 1B-1F to charge the storage device (114), and feed the loads. These loads can be a house, a cell phone tower, a building, etc. If the energy sources are not generating or if the internal consumption is greater than the energy generated by those sources, the Micro-inverter 100 can dispose of the energy stored in the storage devices 308 and send it to the loads. These storage devices can be cell fuels, batteries, or even electric vehicles.

FIG. 3B describes an on-grid system 310 managed by a hybrid Micro-Inverter 100. In this diagram each load uses a Micro-inverter 100 connected to an AC 3 phase source (e.g., connector 111, not shown) and a DC/AC single phase generator (e.g., connector 113, not shown), like a wind turbine 312 and a solar panel 314. The Micro-inverter 100 then uses the built in components described in FIGS. 1B-1F to feed the loads and charge the storage devices 318. If there is not a load requiring energy, and the sources are generating more energy than what is internally consumed, and the storage device is full, the Micro-inverter 100 feeds the surplus energy generated to the grid 320.

Similarly, if the sources are not generating energy or if the internal consumption is greater than the energy generated by those sources, the Micro-inverter 100 disposes of the energy stored in the storage devices 318 and sends it to one or more of the loads, depending on configuration. If there is not enough energy in the storage device, the Micro-inverter 100 takes the differential energy needed from the grid. The discharge rate and the usage of the storage device can be settled to keep part of that energy to be used in case of a disconnection from the grid, like a power outage. The battery can be used as a device to reduce peak consumptions or as a back up solution. The loads can be of different kinds, like a house, a cell phone tower, a building, etc. The storage devices can be cell fuels, batteries, or electric vehicles.

FIG. 3C is a schematic view of the embodiment of the microinverter, similar to the configuration shown in FIGS. 3A and 3B, but connected in a "bypass" configuration to receive energy from an AC renewable source and a DC renewable source and to receive/deliver energy to another microinverter, an electrical load, and an energy storage device. Unless otherwise described, the configuration shown in FIG. 3C can behave in a way similar to the configurations shown in FIGS. 3A and 3B.

FIG. 4A is a view of the output socket from the Micro-Inverter 100. The micro-inverter 100 may be connected to a conventional cable 400, and plugged to any standard female socket 402 connected to the grid. One of the advantages of this solution is that no additional installation is needed to complete the grid-tied connection. The process to disconnect the system is as simple as unplugging the socket from the outlet. The Micro-Inverter 100 can detect valid grid connection and disconnect the feed in case of a power outage as a safety feature. The cable connection 400 can vary depending on the local regulations of the electrical sockets and the power output of the system.

Figure 4B:
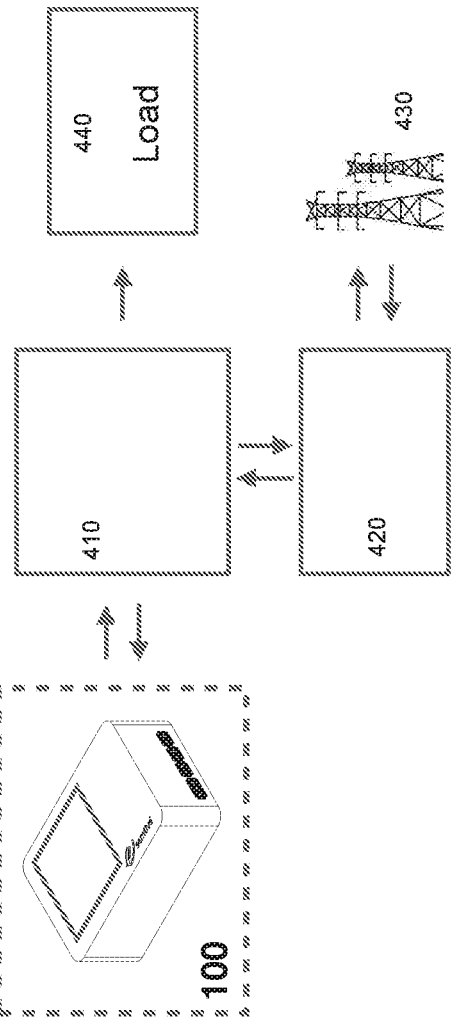
FIG. 4B is a perspective view of an embodiment of a micro-inverter connected to main load center using an independent transfer switch, to receive, deliver or monitor energy uses.

FIG. 4B is a schematic view of an embodiment of the Micro-Inverter 100 and its connections. The micro-inverter 100 may be connected to main load center 410 (e.g., connected to one or more loads 440). The grid 430 is connected to the load center 410 using a transfer switch 420. This allows the array to be isolated in case of a power outage. This configuration allow the system to fully control the energy management behind the meter, and provides a wider range or power outputs form the microinverter.

FIG. 4C is a schematic view of another embodiment of the Micro-Inverter 100 and its connections. The micro-inverter 100 may be connected to main load center 410 (e.g., connected to one or more loads 440). The grid 430 is connected to microinverter 100 using the internal transfer switch features. This allows the array to be isolated in case of a power outage managed by the anti-island features from the microinverter 100. This configuration allow the system to fully control the energy management behind the meter, and provides a wider range or power outputs form the microinverter.

FIG. 5 is a diagram of the way the Micro-inverter 100 merges the existing grid, micro-grids, or grid-tied systems and interacts with them, allowing them to get and feed energy. The inverter/controller can feed a typical 20 A wall circuit as follows. The inverter/controller senses the 50/60 Hz grid voltage provided from the load distribution center in the residence. The inverter/controller synchronizes with grid power to align generated power in lock step with both grid frequency and voltage. The inverter/controller can safely deliver generated power to the load center to offset residential usage with any excess power sent directly to the grid. A typical 20 A circuit has 50% safety margin over maximum continuous rated power from the inverter/controller, yielding minimal wiring power losses. The inverter/controller also includes fail-safe maximum current circuit control to protect the residence from potential short circuits.

FIG. 6A is a schematic view of exemplary components from which the Microprocessor 130 gathers data. As shown in FIG. 1B, the microprocessor 130 is one of the three main components of the system. Using communication protocols, the microprocessor 130 gathers information from the MPPT controller 110 and inverter 120. Additionally or optionally, the microprocessor 130 can use wind turbine(s) 602 to gather wind speed, solar panel(s) 604 to gather solar irradiation data, or different data depending on the energy source (e.g. water flow using a micro hydro generator), the grid 608 and the storage device 610. In other configurations, the microprocessor can also gather information from other data harvesting devices 606 like thermometers, barometer or pluviometers. In some embodiments, each micro-inverter 100 reads the data from the sensors and devices connected to it, creating a weather station.

The raw data 612 gathered includes power generation from all the energy sources, power consumption, amperage from all the energy sources, RPM, voltage from all the energy sources, current storage device charge level, status of the grid, energy consumption levels by appliance, wind speed, pressure, temperatures, sun radiation, among others.

FIG. 6B is a graphic showing how each electronic device produces a differential wave signature 620 in the grid that can be read and interpreted by the Microprocessor 130. In this illustrative graphic, a wave that represents the energy consumed or use signature for each of a microwave oven 622, a washing machine 624 and a television 626. As a result, the microprocessor 130 may identify each device and gather device specific information such as use, rate or amount, time of use, type of device, and energy consumption.

FIG. 7 is a schematic view of instructions performed by the microprocessor 130 to collect raw data 702, generate unique identifiers 704 and supply traceable energy data 706. In this example, there are instructions for use of a blockchain technology to identify with a unique digital signature each value generated. As a result, energy provided by microinverter 100 includes traceability of the information gathered, and accountability for each watt or energy unit generated or used.

FIG. 8 is a diagram that shows how the gathered information (i.e., traceable data) is processed in the Microprocessor 130. As a result, the traceable data (TD) 802 is transformed into useful information or processed data (PD) to be analyzed.

FIG. 9A is a diagram showing how the connectivity board 131, inside Microprocessor 130, uses communication networks 805, like Wi-Fi, Bluetooth or GMS, and connectivity protocols, like NFC technologies, to send the information processed (i.e., processed data/PD 804) back and forth to the Cloud platform 806.

From the Cloud platform 806, that information can be accessed through any smart device 808, like cellphones or laptops as shown in FIG. 9A. Importantly, the integrity of the processed data (PD) is assured by the processing steps performed in FIG. 7.

FIG. 9B describes how one Microprocessor 130, using the connectivity board 131, can share the information back and forth with the Cloud platform 806 and with other Microprocessors 130. This allows different controllers 100 to communicate with each other sharing information, which can include energy transfer requests.

FIG. 10A is a diagram of the Microprocessor 130 with a built in artificial intelligence algorithm (AI Alg) 1002 used to analyze the information (PD) 802. Using this configuration, the analyzed data can be later sent to a server 806 through the connectivity board 131 and accessed by a remote device 1004, like a cellular phone or a computer, as shown. The diagram also shows how the Microprocessor 130 is able to send signals to the inverter 120 component that includes the power electronics in the Micro-inverter 100.

FIG. 10B is a diagram of a system with a similar configuration to the one shown in FIG. 10A, but using an Artificial intelligence algorithm 1012 at a server level. In this case, the processed data is sent to the cloud by the Micro inverter 100 using the connectivity board 131 in the microprocessor 130. The processed data is analyzed by the algorithm 1012 in the cloud and the analyzed data is sent back to the connectivity board 131 inside the Microprocessor 130, which sends control signals to the micro-inverter 120. The processed data can also be accessed by a remote device 1004. This configuration allows the use of additional, different, or analysis algorithms executed on more powerful processors than those provided by the Microprocessor 130.

FIG. 11A is a diagram that shows how the gathered information, analyzed through different algorithms, like AI, can be used for energy management. This way, the Microinverter 100 can set times or windows of time where the use of energy is more reliable, affordable or available. As an example, the Microprocessor 130 recognize and gathered information about the electrical wave signal 620 of each appliance and device 622, 624, 626, individualizing them. (See FIG. 6B) Once the signal is individualized, a list 1102 of devices that are using energy can be sent to the user by the built in user interface or to a remote access point, like a cellular phone application. The user can use the list 1104 select the device or appliance that would like to turn off or on. The signal is sent back by the microprocessor 130 to the Micro inverter 120, that works cutting off or allowing the voltage or amperes in the specific wave of the selected device, permitting or restricting the energy flow to it.

FIG. 11B is a diagram that shows the function described in the FIG. 11A, but using the AI algorithm 1108 in the cloud server to take autonomous decision about energy management. For example, the system can analyze the processed information regarding the use of each device or appliance 622, 624, 626, study historical patterns and other variables like the cost of energy or availability of renewable sources, to interact with the grid, turning appliances or devices on or off. The AI uses the connectivity capability in the Microprocessor 130 to manage the power electronics in the Micro-inverter 120, which controls the individual signal of each device or appliance.

The features described in the illustrative examples of FIGS. 11A and 11B improve energy efficiency by reducing the unnecessary use of energy in the most expensive tiers or when there is not availability form renewable sources.

FIG. 12A is a diagram of a Micro-inverter 100 in an off-grid stand alone configuration. The system uses a wind turbine and a solar panel to generate the energy that is stored in the storage device, like a battery bank, to be converted to AC when is needed by the loads 1212, for example, the appliances and devices of a house. The system also gathers information and transmits it to the server over a communication network 1210 (e.g., using Wi-Fi connectivity or GSM). This information can be used, for example, to learn about usage patterns to improve the efficiency of the system or to evaluate needs in the development of future infrastructure.

FIG. 12B shows the Micro-inverter 100 explained in the FIG. 12A, working in a micro-grid configuration. In this exemplary configuration, a micro-inverter 100 is connected to other similar Micro-inverters 100. As discussed above, the hybrid configuration will generate enough energy to cover the whole requirement from the load, using the storage device as a back up, in case there are no renewable sources available. The energy not used can be exchanged using P2P and blokchain protocols to other nodes in the array, allowing the energy exchange. The micro-inverter 100 can request energy to other micro-inverters 100 in the micro-grid, and can create a smart auction to purchase the energy form the most affordable micro-inverter 100 biding in the auction.

Advantageously, under the configuration illustrated in FIG. 12B, if the system is generating more energy than the one needed by the internal load, the Micro-inverter 100 will communicate with other systems offering the excess generation. In case a system needs more energy that the one that is generating or is stored, it can send a request to the other Micro-inverters 100 asking for the differential amount of energy. The physical connection, like interconnection wires, between the loads, allows the power transmission. Using secure and traceable techniques, such as the blockchain explained in the FIG. 7, each Micro-inverter 100 can keep accountability over the energy consumed or injected to the micro-grid, which system is the one that is sending the energy or which is the one that gets it.

As an example, in this diagram, the micro-grid is includes different kinds of loads. A micro-grid load can be one or more or a combination of different kinds or structures or standalone facilities or free standing infrastructure components. Examples of structures are wide ranging and vary depending on use and may include one or more of single family homes, multiple family homes, telecommunication towers, apartment buildings, commercial buildings, medical clinics, hospitals, warehouses, and industrial facilities, among others.

FIG. 12C is a diagram of an example application of the hybrid micro-inverter technology described herein working as a cluster with other units (see FIG. 12B) along with an external grid connection 1250. In this diagram, each structure uses a Micro-inverter 100, connected to a wind turbine 1202 and one or more other AC and DC sources, like solar panels 1204 and storage devices 1206. In this array, the individual micro-inverter systems are grid-tied. Each system analyzes weather conditions forecasting energy generation using the AI capability explained in FIGS. 10A and 10B. As a result of environmental information obtained by this feature, the grid supplier or utility operator can better predict or estimate future requirements of energy from each Micro-inverter 100, or node of the system, reducing the sensibility of the demand response timing. The Micro-inverter 100, communicates with other Micro-inverters 100 in other systems, and with the utility company. Each system lets the other units know about availability of energy or send requirements for energy if consumption exceeds generation. The systems that have energy in excess can send that energy to the systems that are requiring that energy, and the transaction is tracked using the block chain capability explained in the FIG. 7.

Still further, if there is not a system requiring energy and the units are generating more energy than what is internally consumed or stored, the system can send this energy surplus to the grid or to other microinverters, using the grid-tie connection or the bypass connection, to be transmitted and used in other loads. This energy supplied to the grid is also being tracked by the same block chain technology. If any of the systems has not enough self-generation, an energy demand requirement can be sent to other Micro-inverter 100 or nodes, or to the main grid, getting the energy from another Micro-inverter 100 or and external source connected to the grid.

The exchange of the energy by each node or Micro-inverter 100 with each other, or with the grid, can be done using conventional currencies, other accountability methods like credit or debit notes or cryptocurrencies like for example tokens.

FIG. 12D depicts an array similar to the one shown in the FIG. 12C, but in the specific condition where the conventional grid can not be uses for energy feed in, net metering or energy P2P. In this embodiment, the hard wire bypass connection is the one that allows the energy exchange between the micro-inverters 100, keeping the utility grid connected in case that there is a peak consumption that has to be taken from the utility service.

Additional details for various components or operations of energy generation or storage systems are available in: U.S. Pat. No. 5,601,951; US Patent Publication 20120170325; WO 2015065291; U.S. Pat. Nos. 8,612,058; 7,274,975; 7,561,977; 7,218,974; US Patent Publication 2017/0180134, each of which is incorporated herein by reference in its entirety for all purposes.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc.

Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A self-contained electrical box configured to convert two or more dissimilar electrical inputs into a single electrical output, comprising:
   a maximum power point tracking (MPPT) controller, and an inverter under control of a microprocessor;
   a first electrical connector, a second electrical connector, and a third electrical connector in communication with the MPPT controller or the inverter; and an electrical output from the inverter or the MPPT controller based on an electrical input to the first electrical connector, the second electrical connector or the third electrical connector, further comprising computer readable instructions for using an adaptive step size Perturb and Observe control of boost output current.

2. The self-contained electrical box of claim 1 wherein the input to the first electrical connector, the electrical second connector or the third electrical connector is from 12V to 450V.

3. The self-contained electrical box of claim 1 wherein the electrical input to the first electrical connector, the electrical second connector or the third electrical connector is an AC electrical signal or a DC electrical signal.

4. The self-contained electrical box of claim 1 wherein the electrical input to the first electrical connector, the second electrical connector or the third electrical connector is a single phase or 3 phases.

5. The self-contained electrical box of claim 1 wherein the MPPT controller is programmable.

6. The self-contained electrical box of claim 5 wherein the programmable MPPT controller includes computer readable instructions to receive, optimize and manage electrical inputs from the first electrical connector, the second electrical connector or the third electrical connector provided from a wind turbine and a solar panel or any other variable output generator.

7. The self-contained electrical box of claim 1 further comprising an electrical connector for communication with an energy storage device.

8. The self-contained electrical box of claim 1 wherein the inverter is adapted to deliver energy to an AC electrical load in communication with the electrical output of the self-contained electrical box.

9. The self-contained electrical box of claim 8 adapted and configured to receive inputs from one or more sensors or one or more electrical signals from an electrical generator connected to the first, the second or the third electrical connector to gather data related to meteorological conditions at the electrical generator providing the information.

10. The self-contained electrical box of claim 8 adapted and configured to receive inputs from one or more sensors and electrical signals from an electrical generator connected to the first, the second or the third electrical connector to gather information regarding the performance, operation or characteristic of the electrical generator providing the information.

11. The self-contained electrical box of claim 1 further comprising computer readable instructions performed by the microprocessor to analyze electrical signals and gather information regarding grid energy use.

12. The self-contained electrical box of claim 1 further comprising computer readable instructions performed by the microprocessor to analyze electrical waves signals and to gather information about the use and consumption or specific electrical signature from appliances and devices in the same network.

13. The self-contained electrical box of claim 1 further comprising computer readable instructions to uniquely identify and to trace electronically each parameter gathered by operation of the self-contained electrical box.

14. The self-contained electrical box of claim 1 further comprising a communication module for connection to a platform to send information using communication technologies like WIFI or GSM.

15. The self-contained electrical box of claim 1 adapted and configured for remote connection to another self-contained electrical box using a communication technologies like WIFI or GSM.

16. The self-contained electrical box of claim 11 further comprising computer readable instructions for the microprocessor to process the gathered information.

17. The self contained electrical box of claim 1 configured to exchange energy with a grid or other self contained electrical boxes.

18. The self-contained electrical box of claim 1 further comprising computer readable instructions related to using one or more algorithms, or an artificial intelligence process to analyze information gathered during use of one or more of the self-contained electrical boxes.

19. The self-contained electrical box of claim 1 adapted and configured for connection to an electrical load wherein the electrical outlet is configured for coupling to a conventional electrical female socket or the main load center.

20. The self-contained electrical box of claim 18 adapted and configured to control the use of the energy and the electrical waves signals from the analyzed information.

21. The self-contained electrical box of claim 1 further comprising computer readable instructions for optimizing the electrical inputs to reach a full output capacity of the electrical box.

22. The self-contained electrical box of claim 1, further comprising computer readable instructions for disconnecting from a connected grid and working as an independent electrical box.

23. The self-contained electrical box of claim 1, wherein the controller comprises an active rectifier comprising computer readable instructions configured to accept three phase alternating current inputs and rectify each phase.

24. The self-contained electrical box of claim 1, further comprising computer readable instructions for overriding the step sizes when sudden wind variations exceed a threshold.

25. The self-contained electrical box of claim 1 further comprising a display configured to display information, settings, operational parameters, user preferences related to the self-contained electrical box.

26. The self-contained electrical box of claim 25 wherein the display is configured as a user interface screen adapted and configured to provide touch screen capabilities for operation of the self-contained electrical box.

27. A method of providing a single electrical power output from two or more different electrical inputs, comprising:
receiving a first electrical power signal from a first electrical power source and a second different electrical power signal from a second electrical power source; and
processing the first and the second power signals to provide a single electrical output; and
providing the single electrical output to a standard female power outlet, wherein the processing comprises using an adaptive step size Perturb and Observe control of boost output current.

28. The method of claim 27 wherein any of the electrical power signals are selected from one or more of a three phase AC power source, a single phase AC power source or a DC power source.

29. The method of claim 27 wherein the first electrical power signal, the second electrical power signal or the third electrical power signal is an AC electrical signal or a DC electrical signal.

30. The method of claim 27, the processing step further comprising operation of a programmable MPPT controller having computer readable instructions to receive, optimize and manage any of the electrical inputs.

31. The method of claim 27 further comprising processing steps adapted and configured to receive inputs from one or more sensors or one or more electrical signals from one or more generators, and gathering meteorological and electrical data.

32. The method of claim 27 further comprising processing steps adapted and configured to receive inputs from one or more sensors and electrical signals from an electrical generator providing the first, the second or the third electrical signal to gather information regarding the performance, operation or characteristic of the electrical generator providing the information.

33. The method of claim 27 further comprising processing steps having computer readable instructions to analyze electrical signals and gather information regarding grid energy use.

34. The method of claim 27, further comprising processing steps having computer readable instructions to analyze electrical waves signals and to gather information about the use and consumption or specific electrical signature from appliances and devices in the same network.

35. The method of claim 27 further comprising processing steps having computer readable instructions to uniquely identify and to trace electronically each parameter gathered.

36. The method of claim 27 further comprising communicating to a platform and sending information to a remote computer system.

37. The method of claim 27 methods of further comprising computer readable instructions related to using one or more algorithms, or an artificial intelligence process to analyze the information gathered by receiving and processing the electrical signals.

38. The method of claim 27 further comprising computer readable instructions adapted and configured to control the use of the energy from the analyzed information.

39. The method of claim 27 further comprising providing information related to providing a single electrical power output on a display.

40. The method of claim 39 further comprising interacting with a touch screen operation of the display to manipulate the operations of the steps for providing a single electrical power output.

41. The method of claim 27, comprising processing steps having computer readable instructions to determine whether to override the adaptive step size Perturb and observe control.

42. The method of claim 27, comprising processing steps having computer readable instructions to optimize the electrical inputs to reach a full output capacity of the electrical box.

43. The method of claim 27, wherein the microinverter is configured to use blockchain traceability in energy exchange.

44. The method of claim 27, comprising processing steps having computer readable instructions to disconnect from a connected grid.

45. The method of claim 27, comprising processing steps having computer readable instructions to disconnect from a connected grid.

46. The method of claim 27, comprising processing steps having computer readable instructions to use energy from a connected storage device to reduce grid consumption.

* * * * *